(12) United States Patent
Munro

(10) Patent No.: US 7,679,828 B2
(45) Date of Patent: Mar. 16, 2010

(54) METHOD AND APPARATUS FOR APERTURE SCULPTING IN A MICROLENS ARRAY FILM

(75) Inventor: James F. Munro, Webster, NY (US)

(73) Assignee: Reflexite Corporation, Avon, CT (US)

( * ) Notice: Subject to any disclaimer, the term of this patent is extended or adjusted under 35 U.S.C. 154(b) by 46 days.

(21) Appl. No.: 11/478,567

(22) Filed: Jun. 29, 2006

(65) Prior Publication Data

US 2007/0002453 A1    Jan. 4, 2007

Related U.S. Application Data

(60) Provisional application No. 60/694,838, filed on Jun. 29, 2005.

(51) Int. Cl.
*G02B 27/10* (2006.01)
*G02B 27/30* (2006.01)

(52) U.S. Cl. ................................ 359/627; 359/641

(58) Field of Classification Search ................ 359/619, 359/626–627, 641
See application file for complete search history.

(56) References Cited

U.S. PATENT DOCUMENTS

| | | | |
|---|---|---|---|
| 4,423,137 A | 12/1983 | Rester | |
| 5,278,608 A | 1/1994 | Taylor et al. | |
| 5,453,876 A | 9/1995 | Hamada | |
| 5,598,281 A | 1/1997 | Zimmerman et al. | |
| 5,870,224 A | 2/1999 | Saitoh et al. | |
| 6,327,091 B1 | 12/2001 | Agano | |
| 6,421,103 B2 | 7/2002 | Yamaguchi | |
| 6,633,351 B2 | 10/2003 | Hira et al. | |
| 6,697,042 B1 | 2/2004 | Cohen et al. | |
| 6,784,603 B2 | 8/2004 | Pelka et al. | |
| 6,876,408 B2 * | 4/2005 | Yamaguchi | 349/57 |
| 2003/0207212 A1 | 11/2003 | Law et al. | |
| 2004/0008744 A1 * | 1/2004 | Okazaki et al. | 372/36 |
| 2006/0251215 A1 * | 11/2006 | Cernik | 378/71 |
| 2006/0291067 A1 * | 12/2006 | Davis et al. | 359/641 |
| 2007/0002452 A1 | 1/2007 | Munro | |

* cited by examiner

*Primary Examiner*—Jessica T Stultz
*Assistant Examiner*—Mahidere S Sahle
(74) *Attorney, Agent, or Firm*—Nixon Peabody LLP

(57) ABSTRACT

A collimating sheet, for use with a backlit display and the like, that includes a substrate, a plurality of microlenses on the output side of the substrate, a specularly reflective layer on the side of the substrate opposite the microlenses, and a plurality of apertures in the reflective layer in direct correspondence to the microlenses of the lens array. The specularly reflective layer can be relatively thinner than a diffuse reflective layer, which allows light to pass through the more readily. One or more layers of dielectric can be placed on top of one or more reflective material layers to further improves overall reflectivity. Apertures are preferably made in the light-absorptive and reflective layers with a laser ablation process wherein laser light illuminates the output side of the film. The laser light is brought to a focus by the lenslets of the lens array onto the light-absorptive layer, which then ablates a hole or aperture into the light-absorptive and reflective layer. In this way, the apertures are self-aligned with the lenslets.

30 Claims, 23 Drawing Sheets

METHOD AND APPARATUS FOR APERTURE SCULPTING IN A MICROLENS ARRAY FILM

RELATED APPLICATION

This application claims the benefit of U.S. Provisional Application No. 60/694,838, filed Jun. 29, 2005. The entire teachings of the above application(s) are incorporated herein by reference.

BACKGROUND OF THE INVENTION

Flat panel displays are now generally preferred over cathode ray tubes in a wide variety of applications, ranging from desktop and laptop computers to television screens. The perceived quality of an image reproduced by, say, a Liquid Crystal Display (LCD) depends greatly on its ability to provide high brightness and contrast. Such displays commonly use a backlight arrangement, where a light-diffusing plate is placed between a light source and the liquid crystal panel. It is also common for one or more collimating film sheets to be placed on or near the light diffusing plate. The collimating films serve the purpose of increasing the brightness of the display, a most desirable characteristic.

One type of collimating film incorporates a linear array of prisms molded or cast onto one side of film substrate. Typically the prisms have an included angle of 90°, and by the processes of refraction and TIR (Total Internal Reflection) recycles the on-axis light, and redirects the off-axis, or oblique, light into an on-axis emission direction. Furthermore, this type of collimating film is relatively easy produce, as both the molding process and the mold-generation (i.e., tooling) processes are relatively simple. Lastly, because the TIR and refracting processes are lossless (i.e., non-absorptive), this type of collimating film tends to have high lumen efficiency. However, this prism-based collimating film has two significant drawbacks. Firstly, the emission profile of the collimated light is fairly broad, with half angles of the emission envelope on the order of ±30°, which is generally much wider than the ideal envelope width for most applications. Secondly, the shape of the emission envelope can not be tailored or modified to suit the desired shape for the intended backlight application. That is, because the geometry of the 90° prisms is fixed for maximized collimation, there are no free parameters of the geometry that can be adjusted to modify the shape of the envelope.

Another type of collimating film incorporates an array of microlenses on one side of a substrate, with a reflective surface on the other side in which holes or apertures have been placed in correspondence with the microlenses. The reflective surface is placed towards the backlight or light source, and light from the source either reflects from the reflective surface or passes through an aperture. Nominally when light passes through an aperture it then is refracted by the corresponding lenslet into a collimated direction. There are several benefits of this type of collimating film over the prism-based collimating film. Specifically, the width of the emission envelope can be much less than ±30°, down to ±5° or less. Furthermore, because the amount of light condensation occurring is greater due to the reduced emission angles, the resulting luminance of the backlight that uses a microlens-based collimating element can be substantially improved.

However, for all its benefits, the microlens-based collimating film has proven to be difficult to manufacture. Typically the pitch of the microlenses is on the order of 50 μm, and the width of the apertures is on the order of 15 μm, and the apertures have to be well-aligned, or centered, with the optical axis of the lenslets in order to function. It has been found that producing an aperture that is a few microns in diameter in a reflective layer is problematic, but then doing so while at the same time achieving alignment with a lenslet is extremely difficult, especially over large areas.

Nonetheless, one way to overcome at least some of these difficulties is with a photolithographic process. According to this multi-step process, as taught in U.S. Pat. No. 6,633,351, the usual photolithography steps of 1) applying a resist (to the side opposite the microlenses), 2) exposure (through the microlenses), 3) development of the exposed resist, 4) etching, 5) resist removal, and then finally 6) reflective film formation. Furthermore, steps 3, 4, and 5 involve wet processing, and consume both substantial time and materials to complete. Therefore, the resulting collimating film will be exceptionally expensive to produce, and the end product will be prohibitively expensive to incorporate into any cost-sensitive backlighting application.

For further information on these types of films and backlit display systems see U.S. Pat. Nos. 5,453,876, 5,598,281, 5,870,224, 6,327,091, 6,421,103, 6,633,351, 6,697,042, and 6,876,408.

SUMMARY OF THE INVENTION

Therefore, among the objects of the present invention are to provide a collimating film having high output luminance, whose output collimating envelope can be as little as ±5°, whose output emission profile is tailorable, has high lumen efficiency, is easily manufactured with a minimum number of process steps, and is low cost.

It is also an object of the present invention to create an efficient and low cost collimating film whose output light is diverging at less than ±30° and is compatible with most backlights currently in use.

Another object is to provide a collimating film having a reflective layer that is relatively thin, so that light entering at oblique angles will be more likely to pass through unattenuated.

Yet another object is to provide a collimating film that provides improved light recycling.

A further object is to provide such a film that is easy to manufacture, at lower cost than prior films.

A still further object is to provide such a film that can be tailored to specific desired optical profiles.

According to one aspect of the present invention, a collimating sheet includes a substrate, a plurality of microlenses on the output side of the substrate, a specularly reflective layer on the side of the substrate opposite the microlenses, and a plurality of apertures in the reflective layer in direct correspondence to the microlenses of the lens array. The specularly reflective layer can be relatively thinner than a diffuse reflective layer, which allows light to pass through more readily.

In other embodiments, one or more layers of dielectric are placed on top of one or more reflective material layers. This further improves overall reflectivity of the resulting film.

In still further embodiments, the film includes a substrate, a microlens array on the output side of the substrate, a light-absorptive layer on the input side of the substrate, and a reflective layer on the input side of the light absorptive layer. Apertures are made in the light-absorptive and reflector layers with a laser ablation process wherein laser light illuminates the output side of the film. The laser light is brought to a focus by the lenslets of the lens array onto the light-absorptive layer, which then ablates a hole or aperture into the light-absorptive and reflective layer. In this way, the apertures are self-aligned with the lenslets. The thickness of the substrate is selected such that the ablated apertures reside in the focal plane of the lenslets, meaning that any light that passes through an aperture is substantially collimated by its corresponding lenslet.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of preferred embodiments of the invention follows.

In one embodiment, the present invention includes a film with a substrate, a lens array on the output side of the film, and a specularly reflective layer—with apertures at or near the focal positions of the lenslets of the lens array—installed on the input side of the film. Additionally, a light absorbing layer—with similar apertures—can be installed between the substrate and the reflective layer to facilitate aperture formation and stray light absorption. Furthermore, the specularly reflective layer may include layers of dielectric and/or layered metallic materials.

Other embodiments of the invention are directed to methods of making such films. The specific methods involve the use of a laser to ablate apertures in the collimating film.

Figure 1:
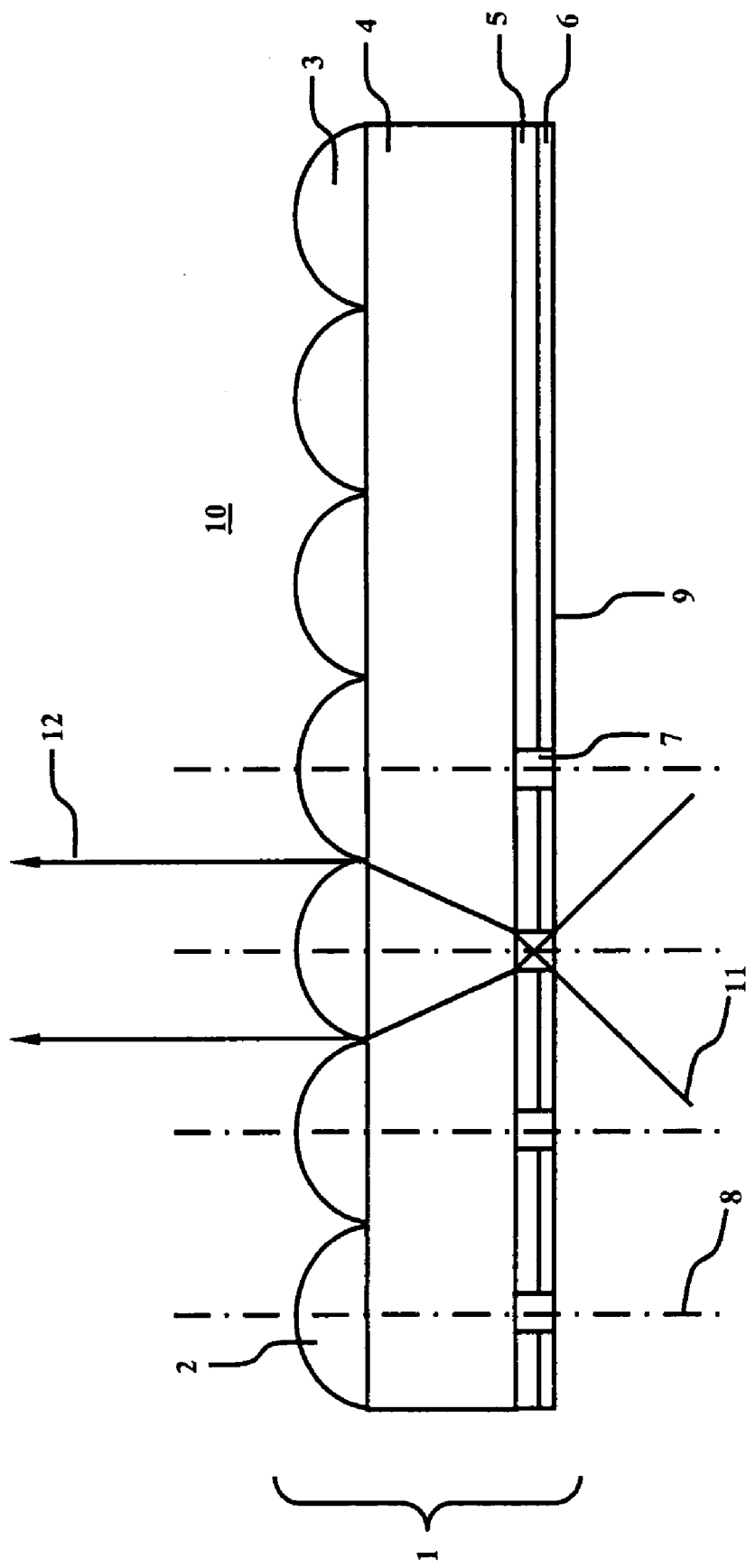
FIG. 1 is a side view of one embodiment of the collimating sheet.

Referring to FIG. 1, the collimating film 1 is shown to be made from a substrate 4, a lens array 3 comprised of a plurality of individual lenslets 2, an optional light absorptive layer 5, and a reflective layer 6. The input side 9 and output side 10 are also shown, which denote the input and output sides of the film as it is used in its end-use (and not during fabrication, which the input and output sides are reversed). Apertures 7 are installed through the reflective layer 6 and optional light absorbing layer 5 in such a way that the apertures 7 are substantially aligned with the optical axis 8 of the individual lenslets 2, although the apertures 7 could all be misaligned with the axis 8, or even randomly misaligned with the axis 8 depending on the desired performance of the collimating film.

The substrate 4 is typically made from PET, although polycarbonate and acrylic can also be used. In general, a higher refractive index, greater than 1.50, is desirable for the refractive index of the substrate 4 so that the angular width of the cone of light within the substrate 4 is minimized. The substrate 4 thickness is linked to the diameter of the lenslets 2 by the critical angle of the light traversing the substrate 4 in use. The larger the lenslets 2; the thicker the substrate 4. Typically the lenslets 2 have a diameter or center-to-center spacing of less than 100 micrometers (μm) so they are not discernible to a viewer, which generally means that the thickness of the substrate 4 should be less than about 70 μm, although larger lenslet 2 diameters and thicker substrates 4 can be used. However, lenslet diameters and center-to-center spacings of greater than 100 μm are acceptable if the viewer is located far away from the display.

The reflective layer 6 is preferably made to be as thin as possible, preferably less than 25 μm, to facilitate its removal and to keep its cost as low as possible. The reflective layer 6 is preferably specularly reflective and made from a metal, such as aluminum or silver, or from a multilayer stackup of dielectric materials. A specularly reflective layer is preferred as it can be thinner than a comparable diffuse reflective layer, which in turn permits more of the incident light to pass through apertures 7. The reflective layer can also alternately be diffusely reflective, however, and have constituent components of polytetrafluoro-ethylene (PTFE), barium sulfate, or titanium dioxide. Regardless of whether the diffusive layer 6 is specularly or diffusely reflective, it is highly desirable from an efficiency point of view that its reflectivity is as high as possible with a minimum reflectivity of 80%, preferably 90%, and more preferably greater than 95%.

If the reflectivity of the reflective layer 6 is too great, however, then it is difficult to remove the reflective layer 6 at the apertures using a laser ablation process described below. In this case a light absorptive layer 5 placed between the substrate 4 and the reflective layer 6 improves the aperture formation process as well as absorb unwanted stray light on the output side of the collimating film. As with the reflective layer 6, the optional light absorbing layer should also be as thin as possible, preferably less than 25 μm. Materials for this layer can include chromium as well as other materials having black carbon particles.

Figure 2:
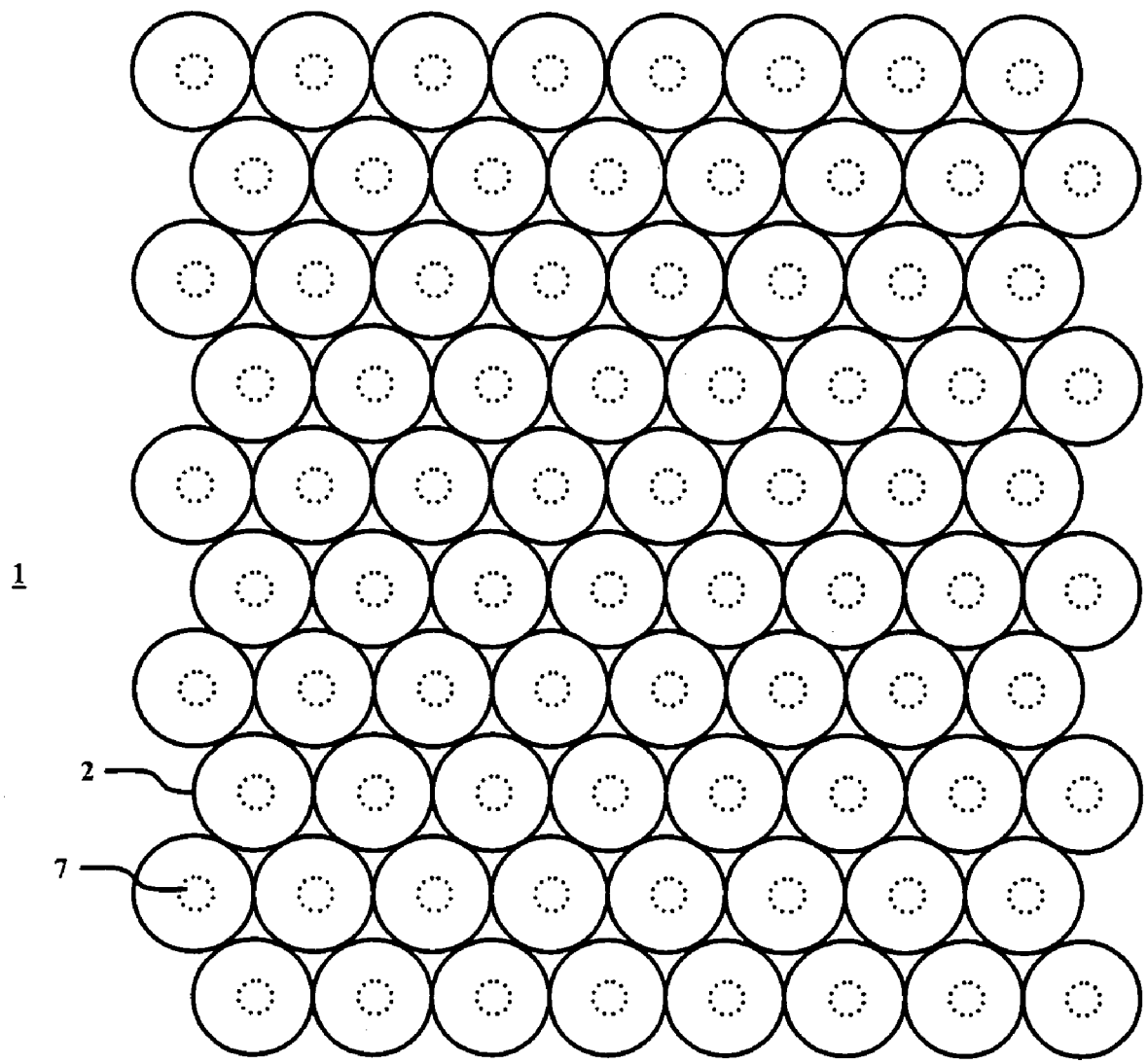
FIG. 2 is a top view of the collimating sheet where the microlenses are packed in a hexagonal arrangement.
Figure 3:
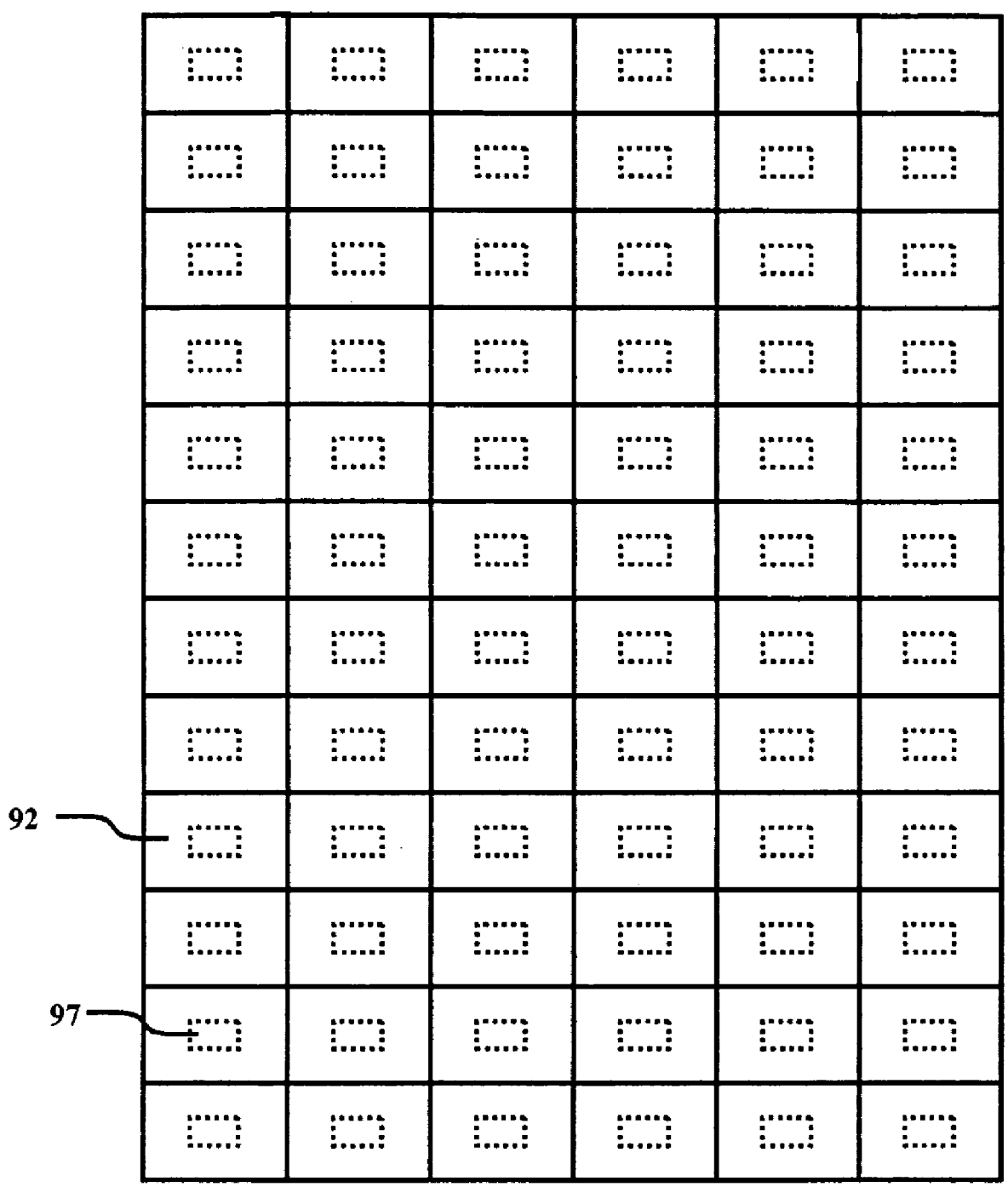
FIG. 3 is a top view of a collimating sheet where the microlenses are packed in a rectangular arrangement.

FIG. 2 illustrates a front view of a portion of the collimating film 1, in which the lenslets 2 are packed hexagonally in an array, e.g., each lenslet 2 has 6 immediate neighboring lenslets that are just touching each other. Alternately the lenslets 2 can be packed in other patterns, such as square or rectangular, (as shown in FIG. 3) and they can be overlapping with one another (which results in truncated lenslets at the line of intersection), or they need not touch one another at all.

In general, the lenslets should be packed as tightly as practicable to maintain system efficiency and light throughput. A fill factor of at least 50% is preferred, in which more than 50% of the output surface area is occupied by the lenslets 2 of the lens array 3. Also shown in FIG. 2 are the apertures 7 in a concentric positional relationship with the lenslets 2 of the lens array 3, although they need not be concentric. In the case of rectangular lenslets in FIG. 3, the lenslets 2 and apertures 11 may also be rectangular, or nearly rectangular, although other shapes are also possible.

Referring back to FIG. 1, input rays 11 originating from a light source or light mixing chamber or a lightguide (not shown in FIG. 1 but shown and discussed later in connection with FIGS. 14 and 15) enters an aperture 7 at the input side 9 of the collimating film 1. The light 11 is then refracted into the substrate 4 and reaches the lenslet associated with the aperture 7 that it entered. The light ray then is refracted by the lenslet in such a way that the exiting ray 12 is substantially parallel to the optical axis 8. However, if the size of the apertures 7 is not small compared to the size of the lenslets 2, then the exiting ray 12 will not be parallel to the optical axis 8. Having a larger aperture 7 is beneficial in that it allows for an increased level of light to pass through the collimating film, but with the trade-off of less collimation. If the apertures 7 are not aligned with their respective lenslets 2, the transmitted light 12 is still substantially collimated, but travels in a direction that is not parallel to the optical axis 8.

Figure 4A:
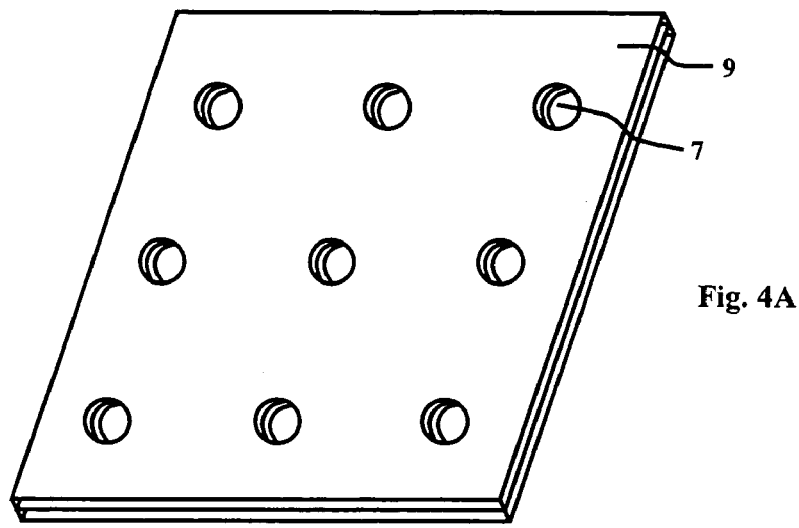
FIG. 4A is a close-up view of an array of circular apertures viewed from the input side.
Figure 4B:
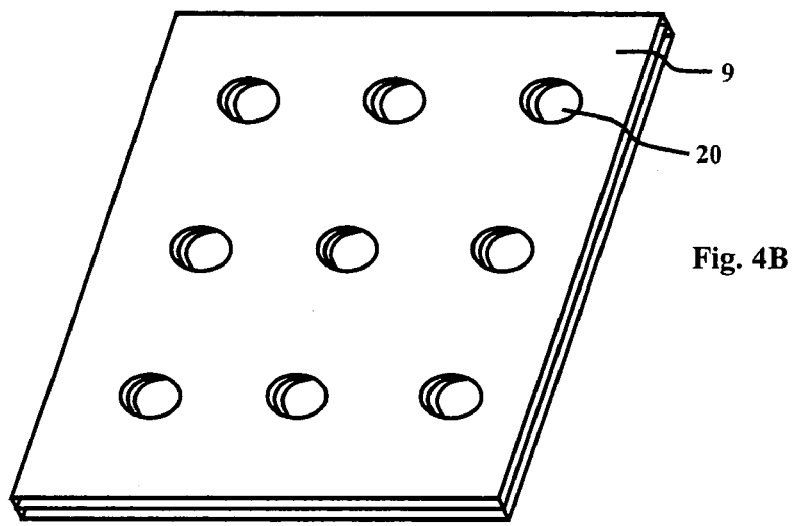
FIG. 4B is a close-up view of an array of non-circular apertures viewed from the input side.

In some applications it is desirable that the degree of collimation is different in one axis as compared to another. If the apertures 7 are round, as in FIG. 4A, the output light has a circularly symmetric profile, and the light in the vertical axis has the same degree of collimation as the light in the horizontal axis. However, if the apertures 20 are made elliptical as shown in FIG. 4B, then the output profile is asymmetric with less collimation in one axis as compared to the other. This is often desirable in LCD panels where it is beneficial to have a wider display viewing angle in the horizontal direction than in the vertical direction. This asymmetry is even more desirable in automotive dashboard display applications where a large amount of light should be directed to the driver and passenger seat with less light being directed between them, and no light being directed to the ceiling or floor. The aperture shapes of FIG. 4C can accomplish this emission profile. Note that the apertures 21 shown in FIG. 4C can be assembled from multiple offsetting circular apertures.

Figure 5A:
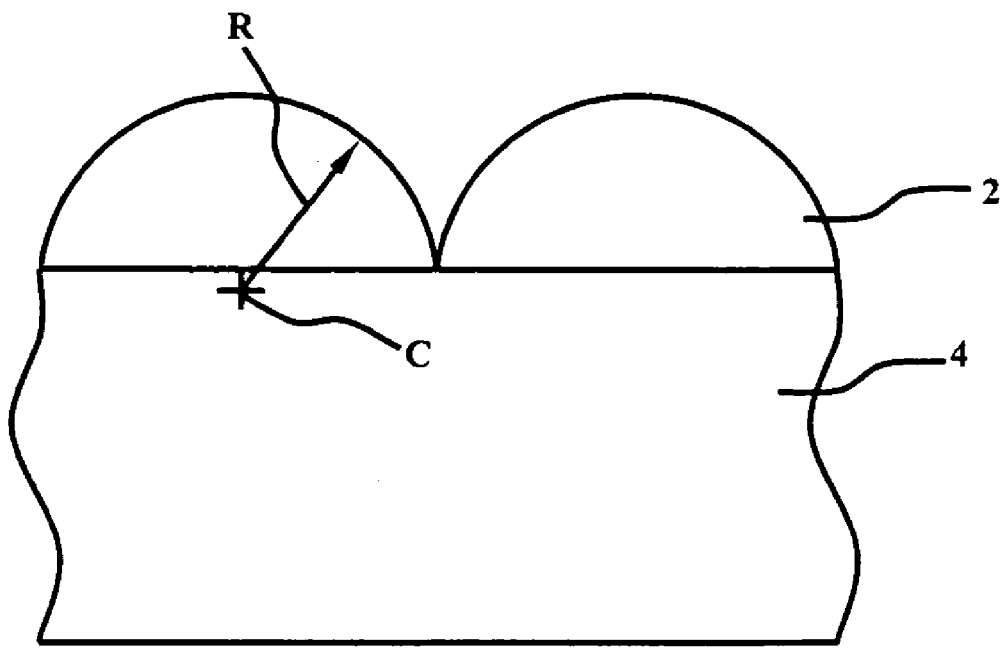
FIG. 5A is a close-up view of a spherical microlens.
Figure 5B:
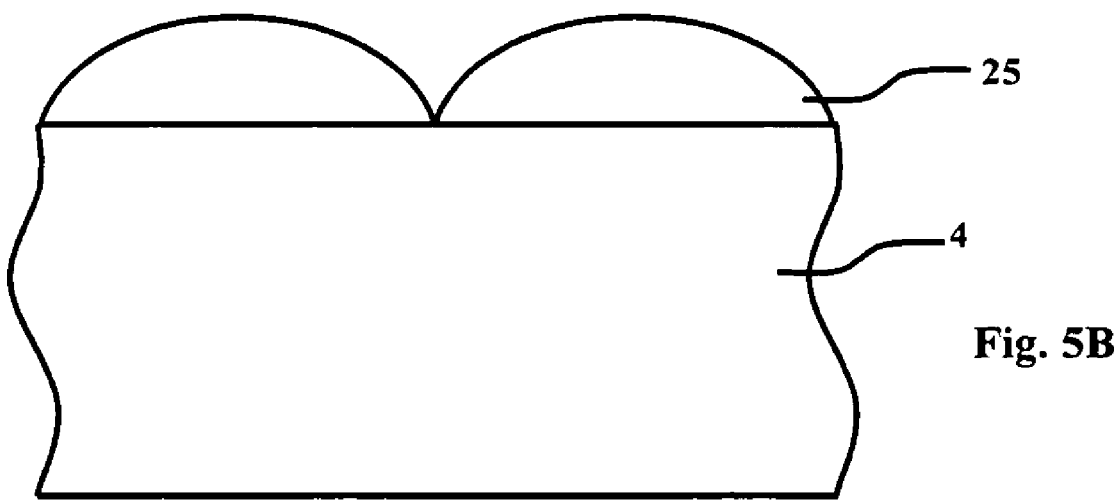
FIG. 5B is a close-up view of an aspherical microlens.

The lenslets 2 comprising the lens array 3 can be spherical in shape as shown in FIG. 5A. In this case the lenslets 2 have a radius of curvature R and a center of curvature C. The center of curvature C nominally lies on the optical axis 8 of the lenslet 2. Alternately the lenslet can be aspherical, such as one having an elliptical shape 25, as shown in FIG. 5B with the elliptical prescription being the same for both axis (that is the lenslet 2 is symmetric with an elliptical cross-section, regardless of which cross-section is viewed). Instead of an ellipse, the cross-section can be a polynomial of arbitrary degree. The lenslets 2 need not be symmetric, and the cross-section can vary with the selected sectional axis, and the lenslets need not be symmetric about the optical axis 8.

Figure 6A:
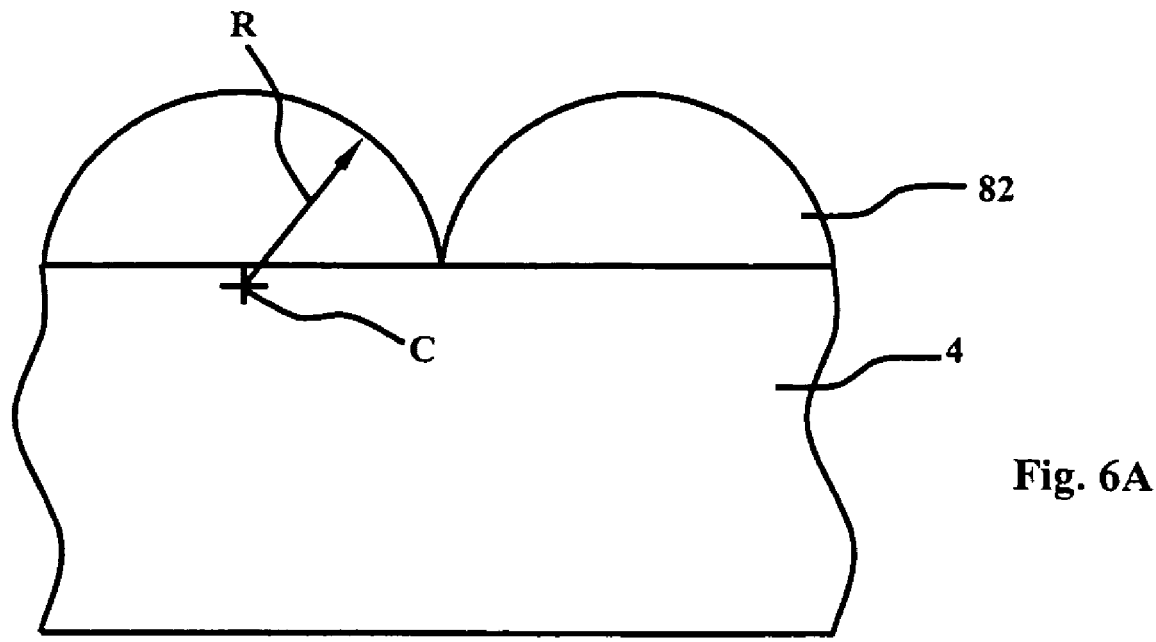
FIG. 6A is a view of a spherical lenticular embodiment.
Figure 6B:
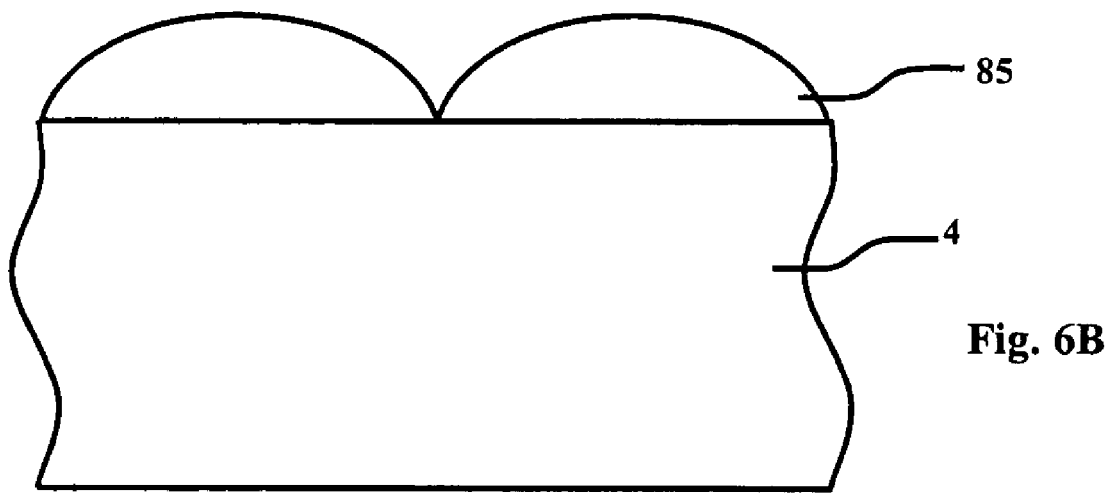
FIG. 6B is a view of an aspherical lenticular embodiment.

In the limit, the lenslets can be lenticular in nature, in which the array of lenslets is simply a one-dimensional array of lenticulars, as shown in FIGS. 6A and 6B. In this case the apertures associated with the lenticulars would be linear openings in the reflective layer 6 and optional light absorbing layer 5. As with the 2D array of lenslets, the cross-sectional profile of the lenticulars can be circular 82 or non-circular 85. Regardless of whether the lenslets 2 are lenticular or not, the lenslets are generally optical fast having an F/#, defined as the lenslet's focal length divided by their width, of less than 1.0. In some cases, however, where for example the thickness of the reflective layer 6 and optional light absorbing layer 5 produces a louvering effect that restricts the angular width of the cone of light incident on the lenslet 2, an optically fast lenslet 2 is not required, and the F/# of the lenslet 2 can be more than 1.0. Furthermore, the lenslets 2 of the lens array 3 need not all have the same prescription. The prescriptions among the lenslets 2 can be randomized, pseudo-randomized, or vary in a pattern across the width or height of the lens array 3.

Figure 7:
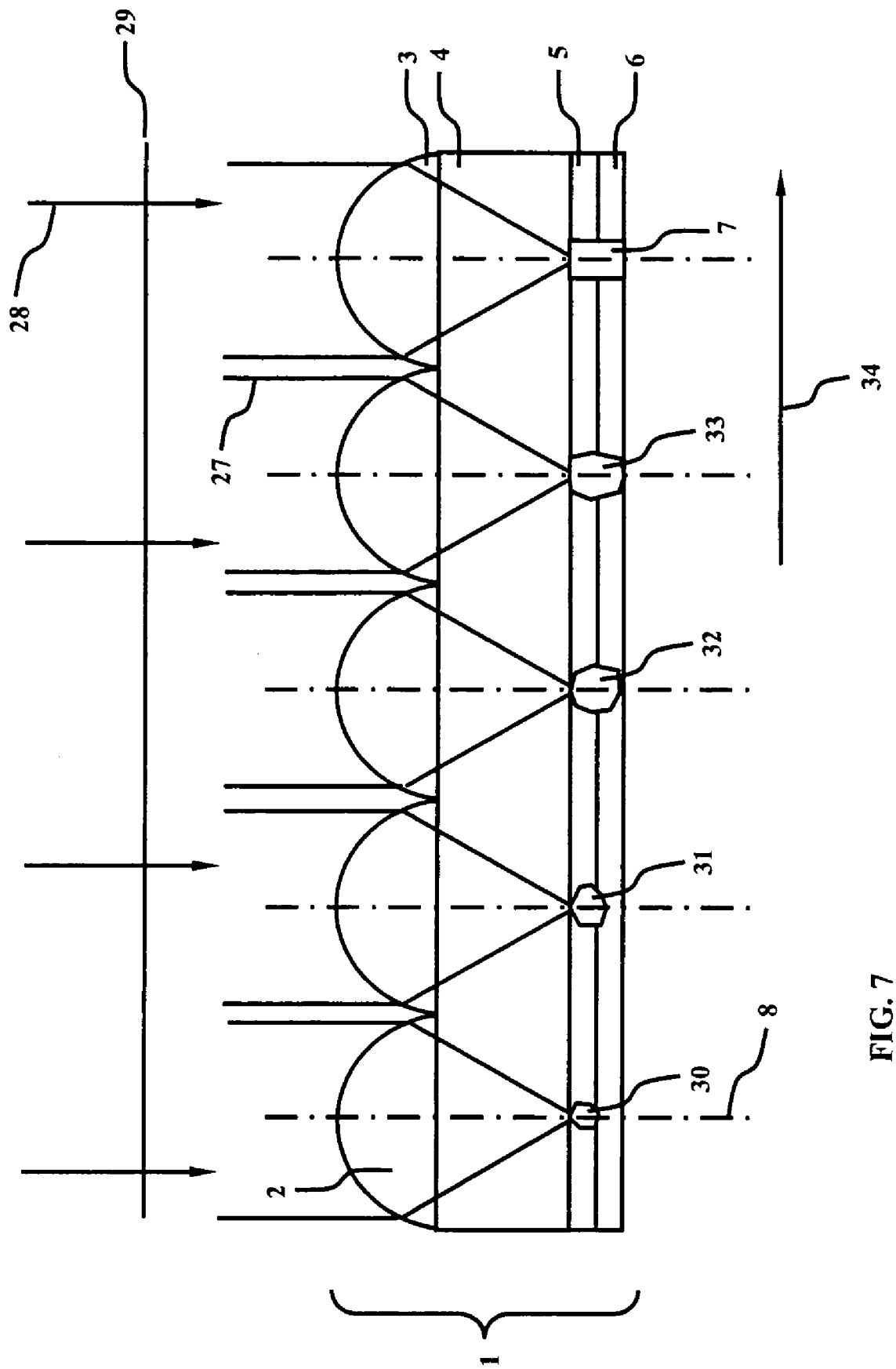
FIG. 7 is a general diagram showing how apertures can be formed with laser ablation.

To make the apertures 7, laser ablation methods can be used. As shown in FIG. 7, and described in greater detail later below, the collimating film 1 is illuminated from the output side by high-power laser light 27 (such as from a YAG laser) having a wavefront 29, and traveling in a direction 28 so that the lens array 3 is illuminated by the laser light 27. When a lenslet 2, is illuminated by the laser ablating light 27, the lenslet focuses the ablating light 27 onto a small area of the optional light absorbing layer 5, or onto a small area of the reflective layer 6, at the focal position of the lenslet 2. The focusing characteristics of the lenslets 2 of the lens array 3 act to magnify the power density of the laser ablating light 27 at the focal positions to a level that exceeds the ablation threshold of the optional light absorbing layer 5, or the reflective layer 6, and the optional light absorbing layer 5 or the reflective layer 6 is vaporized and removed at the focal position resulting in an aperture 7 through the optional light absorbing layer 5 and the reflective layer 6.

Figure 4C:
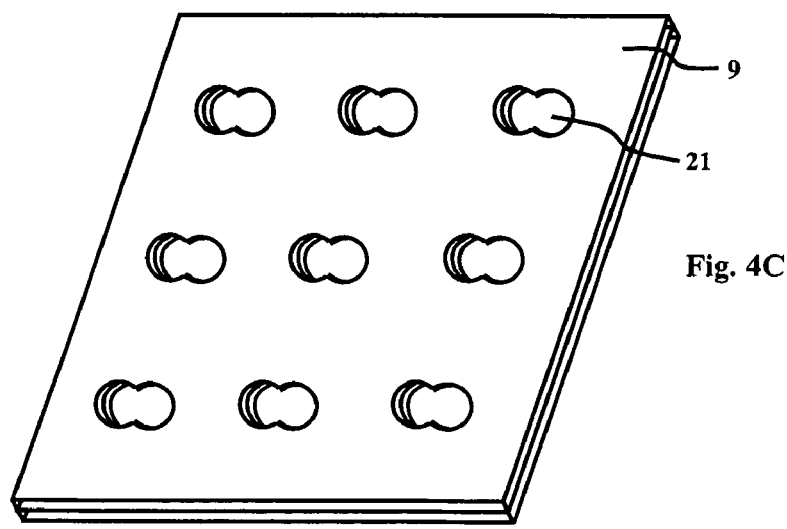
FIG. 4C is a close-up view of an array of non-circular apertures made from two partially overlapping apertures, viewed from the input side.

A variation on this laser ablation process is to direct the high-power laser light 27 onto the collimating film at an angle with respect to the optical axis 8 of the lenslets of the lens array. In so doing the resulting aperture 7 is located at an offset with respect to the optical axis 8. This off-angle ablation process can be repeated with the high-power laser light 27 being directed onto the collimating film at a second angle with respect to the optical axis 8, thus producing a second aperture, which can be partially overlapping the first aperture, as shown in FIG. 4C. Additional ablation passes made with the high-power laser light 27 being directed onto the film at additional angles with respect to the optical axis 8 can be made, resulting in nearly arbitrarily shaped aperture 7 desired.

As shown in FIG. 7, the laser light 27 is stationary, and the collimating film is moved in a lateral direction 34 such that all lenslets of the lens array are eventually illuminated. In FIG. 7, the process of aperture formation is shown, wherein the apertures 7 that have been exposed to the laser ablation light the longest length of time have finished apertures, whereas aperture 33, whose corresponding lenslet has been exposed to the laser ablating light 27 for a shorter period of time, is incomplete. Furthermore, apertures 32, 31, and 30 are in the early formative stages Alternate laser ablation setups include those where the laser beam is scanned or rastered across a stationary film, or where both the film and the laser beam are in motion, or where neither the film or the laser beam are in motion and the beam characteristics, such as diameter and energy, permit for the entire film to be sufficiently exposed all at once.

One preferred method of laser ablation considers that the angular output light emission profile is dependent on the size and shape of the apertures 7, 20, 21 in the reflective layer 6. Indeed, the ability to control the size and shape of the aperture (s) can greatly improve the suitability of the film to a broader range of markets, such as the avionic and automotive display markets. Thus a preferred ablation method provides a way to sculpt the aperture to nearly any desirable size and shape.

As explained in connection with FIG. 7, the apertures are preferably made with a laser ablation process in which the beam from a high-powered laser illuminates the microlens 2 side of the film, and wherein the laser beam is focused by the lenslets 2 to a small point on the reflective layer 6 (or underlying absorptive layer, if used), at which point the reflective layer 6 ablates away leaving a clear aperture 7 for light to pass through. Typically the laser beam is 1 mm or less in diameter, and either it must be scanned or rastered across the entire workpiece, or the beam must be held stationary and the workpiece moved such that the entire film is illuminated.

Figure 16:
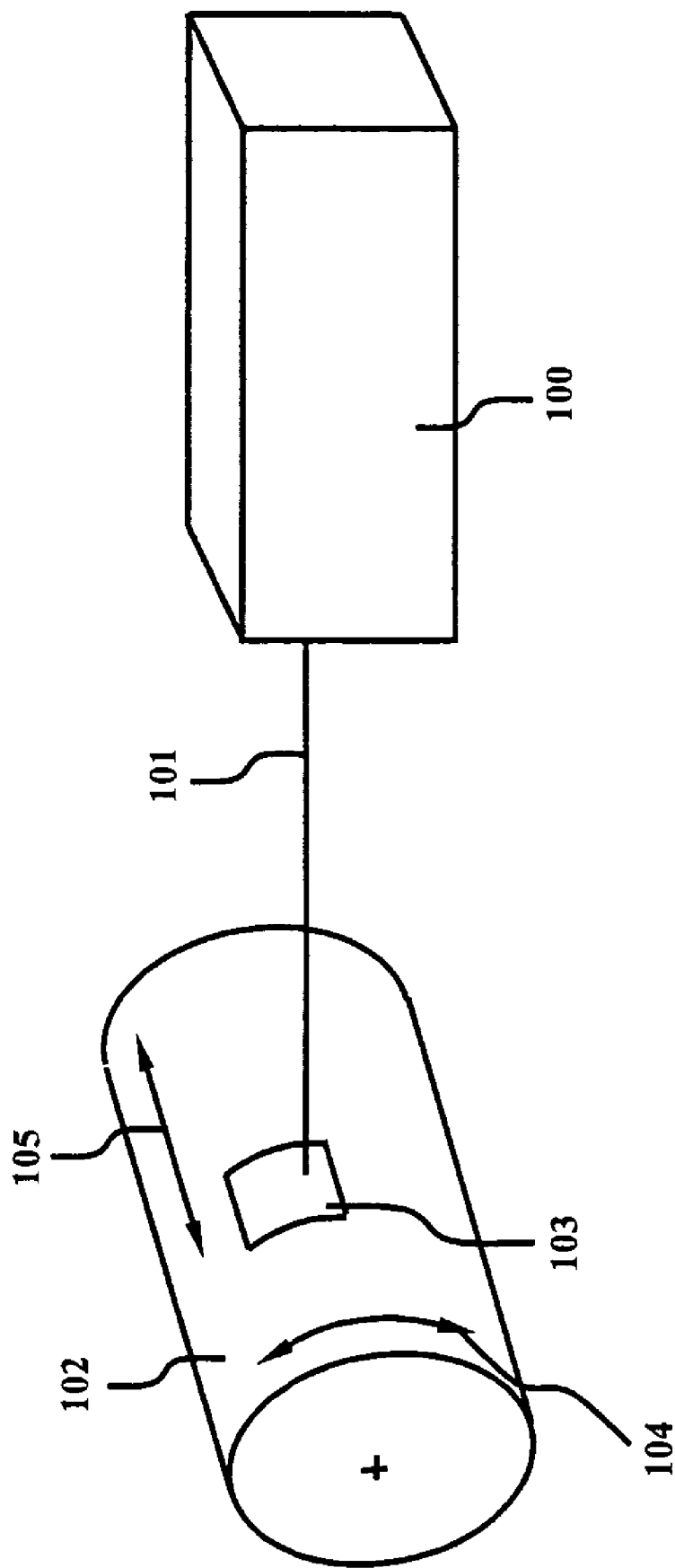
FIGS. 16 and 17 are a general schematic and more detailed isometric view of a laser ablation apparatus.
Figure 17:
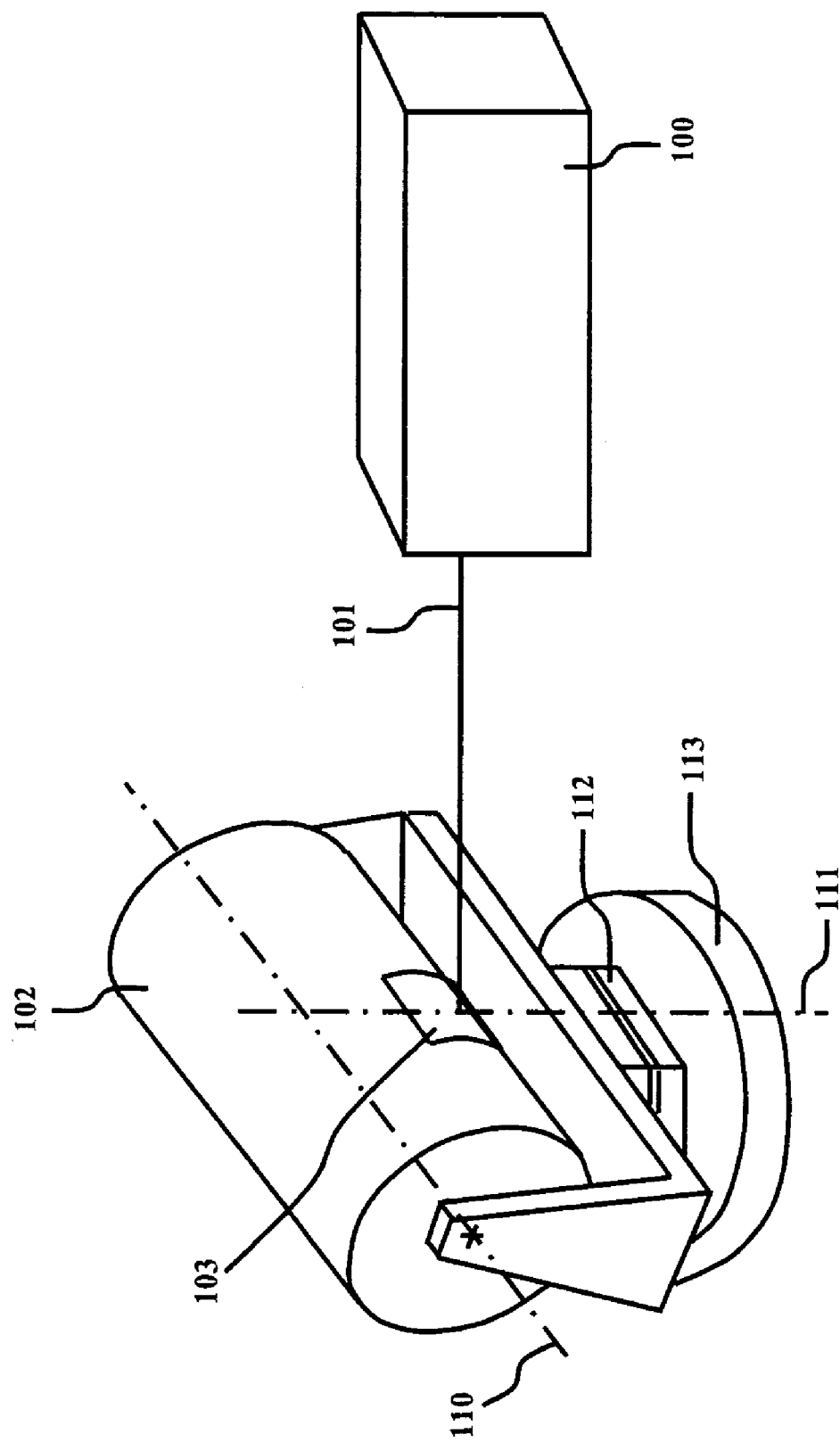

In a preferred method, better results are obtained with a stationary laser beam in which the film workpiece is attached to a rotating and translating drum, as shown in FIG. 16. Note that in this ablation setup the laser beam 101 is incident at a 90 degree angle to the workpiece 103 being ablated, which results in a substantially circular aperture 7 located on the optical axis of the microlenses. As shown in FIG. 17, the drum 102 can be rotated through path 104 about a central axis 110 to provide vertical positioning; the laser beam 101 and/or drum 102 can also be steered along horizontal plane 105. The laser 100 can thus be directed on any selected spot anywhere in workpiece 103.

Figure 18A:
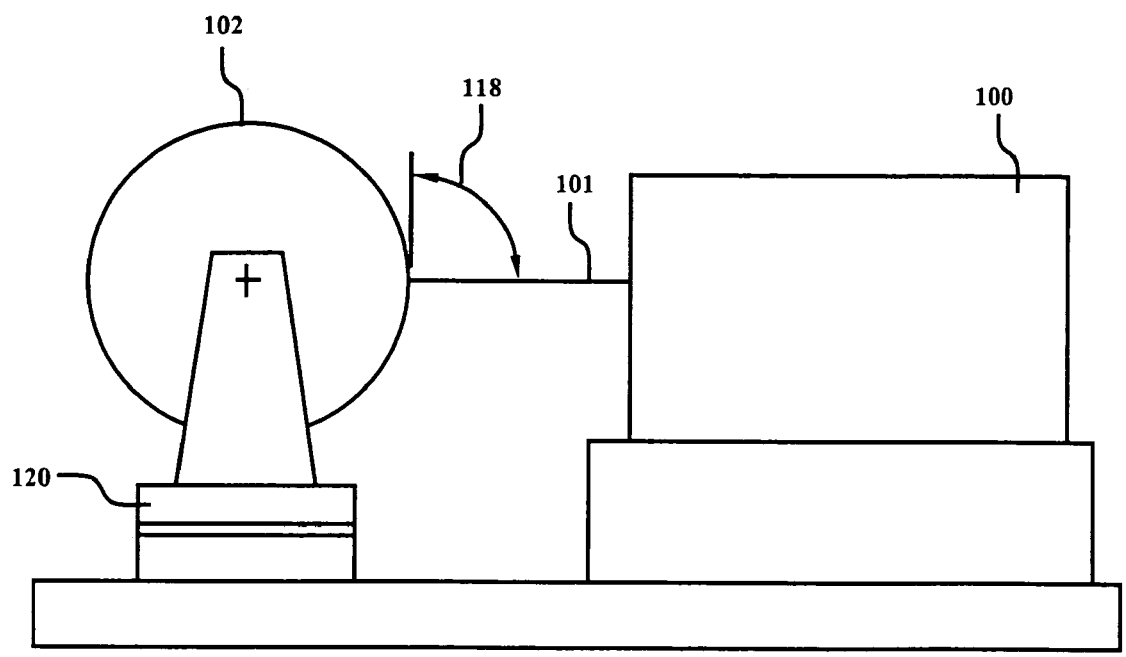
FIGS. 18A, 18B, 19A and 19B are side and top views of laser ablation apparatus showing vertical and horizontal translation used to sculpt apertures.
Figure 18B:
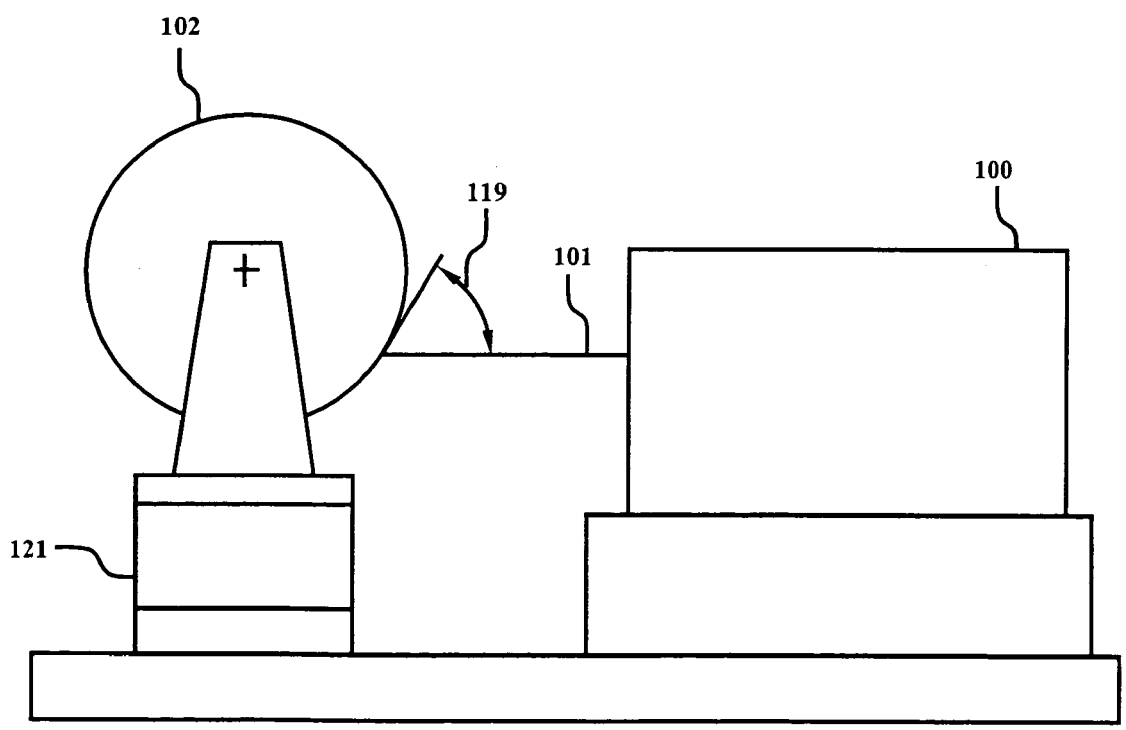
Figure 19A:
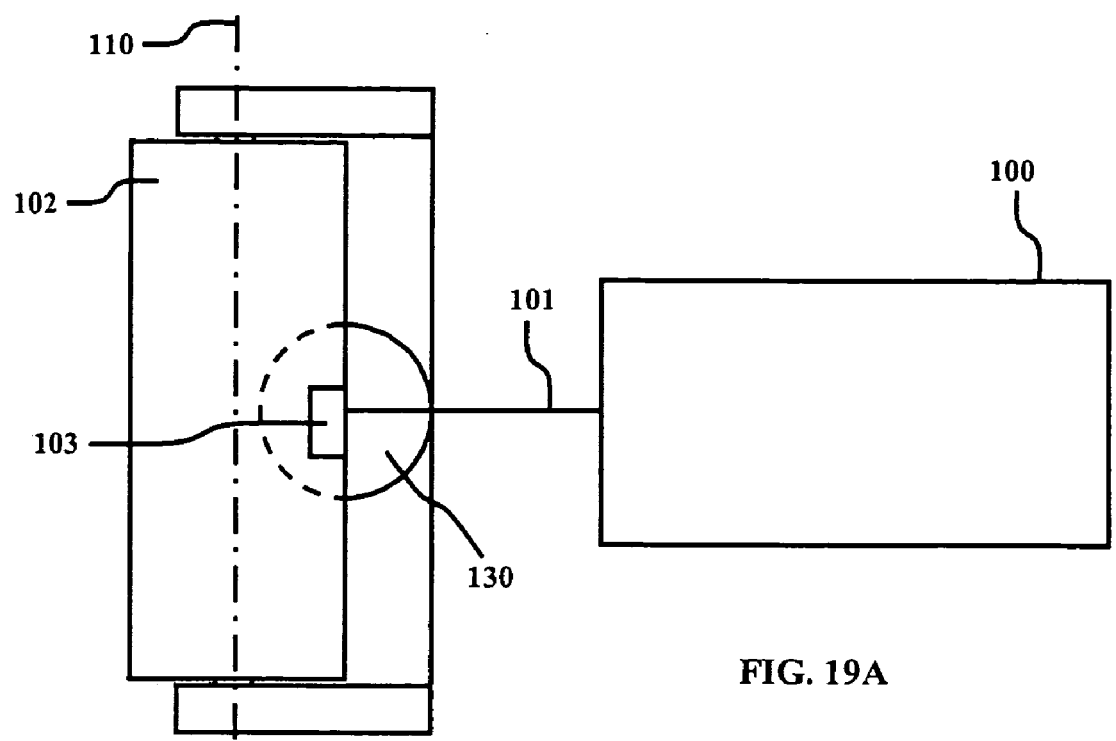
Figure 19B:
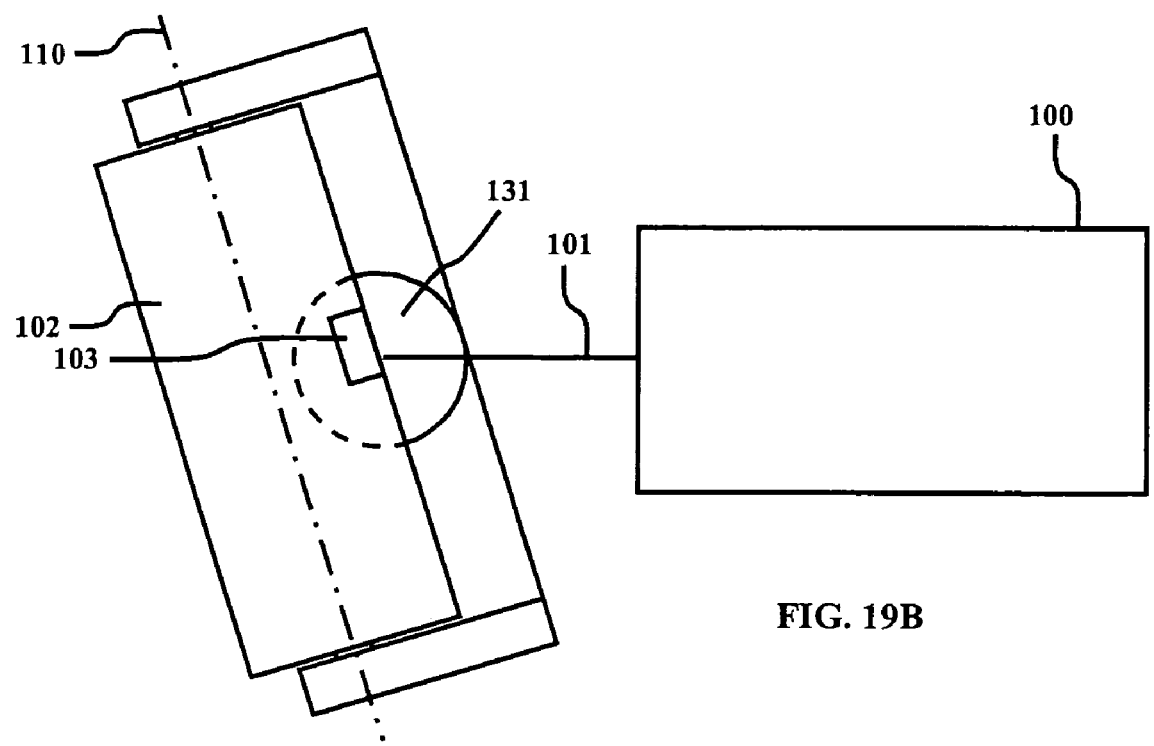

To sculpt the aperture to an arbitrary shape, the angle of incidence of the laser beam 101 with respect to the film being ablated must be varied. To further vary the angle in the vertical plane of incident, the entire drum 102 can be raised or lowered with a vertical translation stage 112. To change the angle in the horizontal plane of incident, a rotational or "swivel" stage 113 can be used. FIG. 17 illustrates this concept. While the vertical or horizontal movement can be a simple linear motion, it causes the laser 101 to be incident on a different location of the circular cross section of the drum 102, thereby changing the angle of incidence in the vertical plane. Compare the difference between the position of the apparatus shown in FIG. 18A with the translated position in FIG. 18B—the angle of incidence 119 in the vertical plane has been altered. FIG. 19A illustrates the apparatus in a first position 130 with a horizontal angle of incidence being about 90 degrees; FIG. 19B illustrates the apparatus in an alternate position 131 with a different horizontal angle of incidence. To vary the angle in the horizontal plane, the drum 102 can be swiveled via the horizontal "swivel" rotation stage 113 about a vertical axis 111 that includes the nominal point of ablation.

To ablate a sculpted aperture of more or less arbitrary shape, several cycles or passes of ablation can be executed, with each ablation cycle occurring at a different laser angle of incidence with the workpiece 103, as determined by the orientation of the vertical translation stage 112 and the swivel rotation stage 113. For each cycle the entire workpiece 103 must pass under the laser beam 101, which is done by the positioning the drum by rotating it about its horizontal axis 110 and its horizontal swivel translation stage 113 as noted above. After several cycles of ablation at the differing incident angles, the apertures 7, 20, or 21 will form, and will have the shape of the superposition of all of the individual sub-apertures created with each cycle.

There are several variations on this basic concept, including:

1) The workpiece 103 is not attached to a sleeve which is attached to the drum frame, but instead the film is increased in size so that it can become the sleeve itself and thus be attached directly to the drum frame. This facilitates economies of scale.

2) Only vertical translation stage 112 is used (no swivel stage 113).

3) Only the swivel rotational stage is used 113 (no vertical translation stage 112)

4) All four (or three) axis of motion are under computer control.

5) The workpiece 103 can be stationary, and the laser beam 101 can be made to translate (raster) across the workpiece 103 over many cycles, each cycle at a different incident angle. Note that there are still four (or three) axis of motion.

6) Two or more apertures can be made per lenslet, each aperture being sculpted or not.

The benefits of laser ablation in this manner are 1) low (recurring) cost of manufacturing custom collimating films with tailored emission profiles, and 2) relative ease to automate, as compared to lithographic techniques.

One possible difficulty with the laser ablation process is the creation of high-fidelity apertures. Specifically, when the metal reflective layer 6 is thicker than about 20 nm, a ring of metal forms at the periphery of the aperture 7, and this build-up of metal prevents usable oblique light from entering the aperture, thus reducing the efficiency and performance of the collimating film. Furthermore, metal reflective layers less than 20 nm in thickness, such as Chromium, Aluminum, and even Silver, are quite transmissive and have poor reflectance.

Figure 20A:
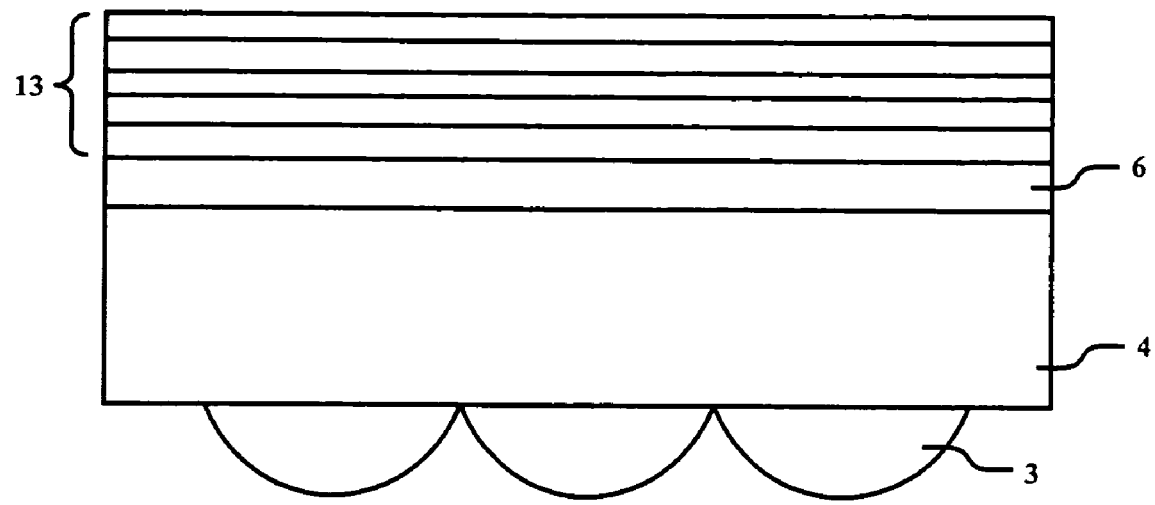
FIGS. 20A and 20B are views of a metal/dielectric layer before and after ablation.
Figure 20B:
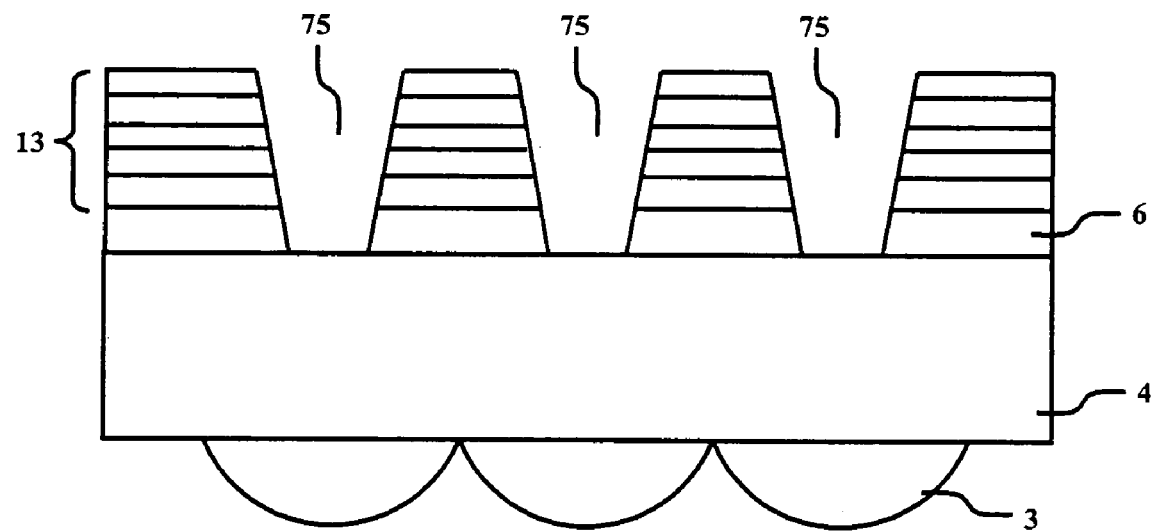

A first solution (referred to as embodiment #1 herein) is to use a metallic layer of about 20 nm in thickness, and then install a dielectric film stack 13 atop it to achieve the desired reflectivity. A further requirement of the dielectric stack 13 is that it must cleanly break clear of the film during the ablation process. See FIGS. 20A and 20B for a general illustration of this concept.

Figure 21A:
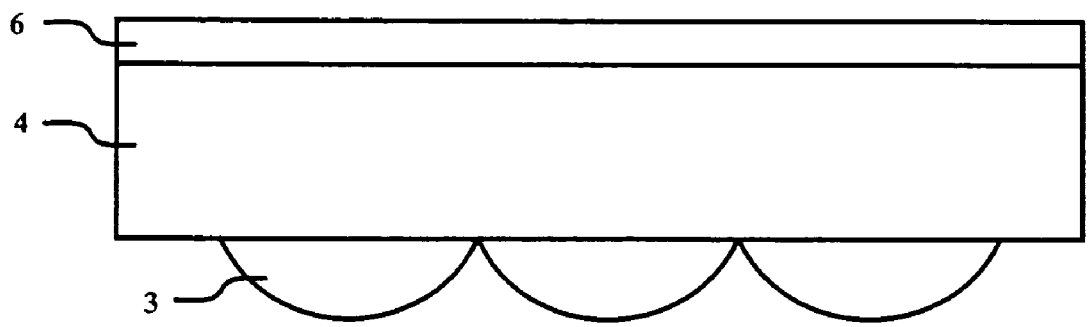
FIGS. 21A through 21C illustrate one possible sequence of process steps for forming a reflective layer.
Figure 21B:
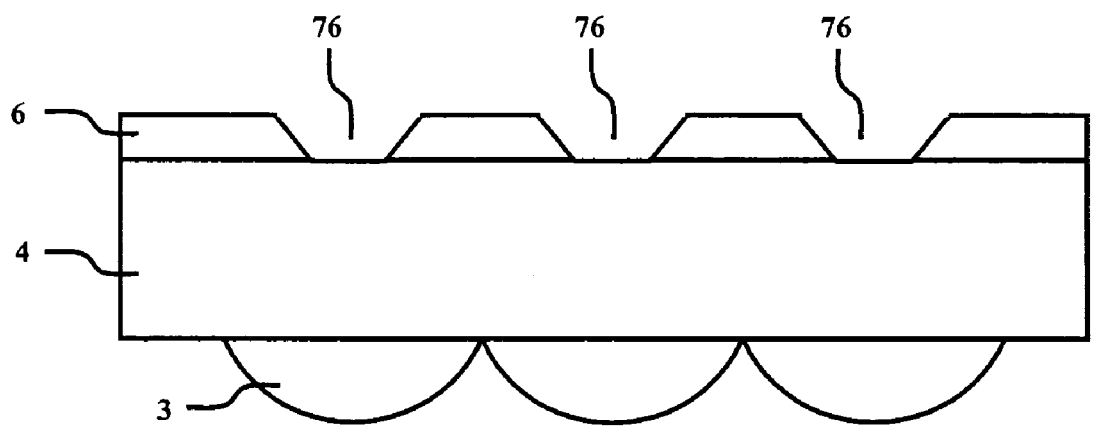
Figure 21C:
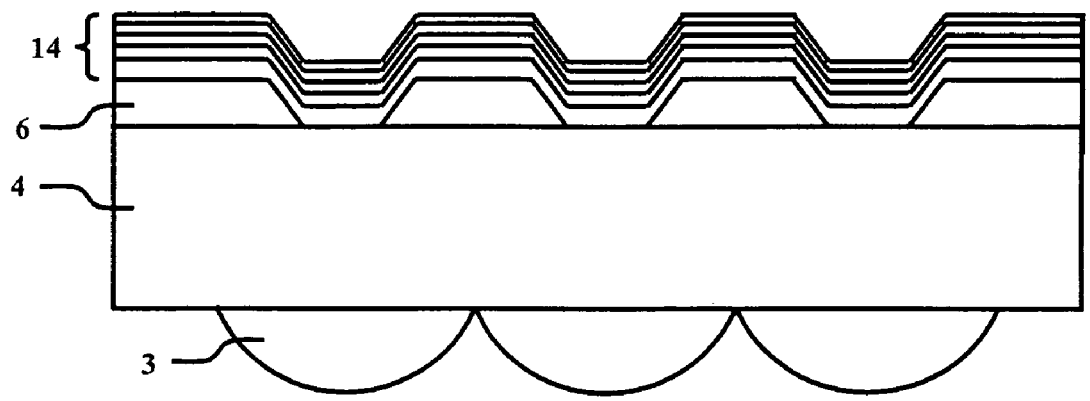
Figure 22A:
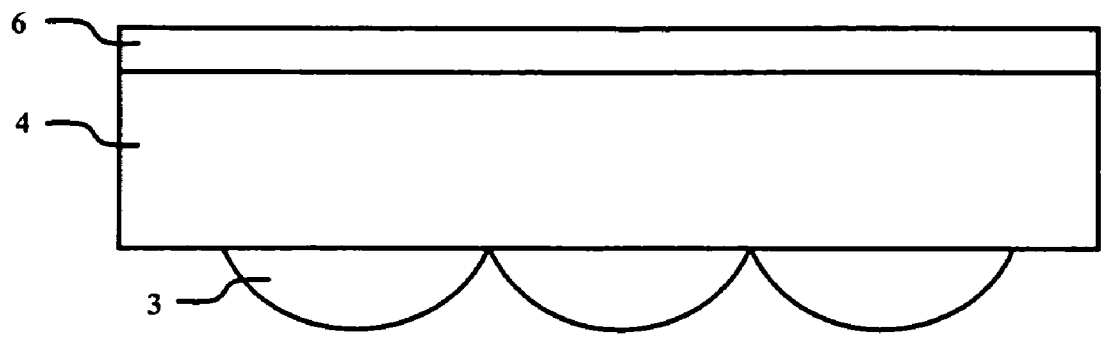
FIGS. 22A through 22E are an alternate method of forming the reflective layer.
Figure 22B:
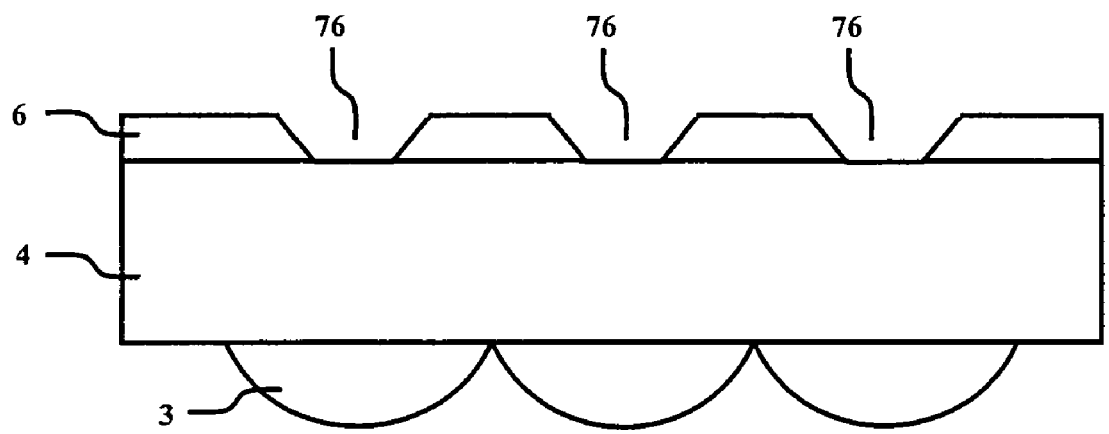
Figure 22C:
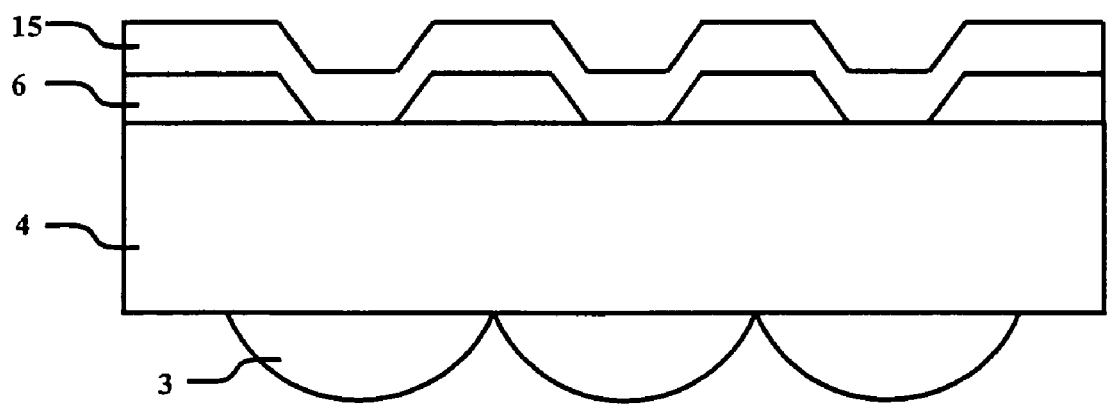
Figure 22D:
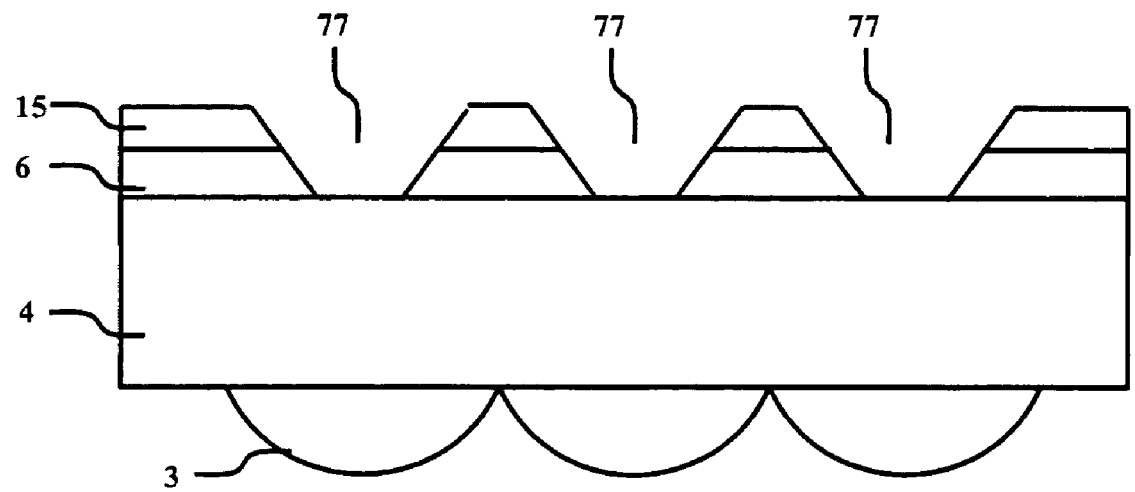
Figure 22E:
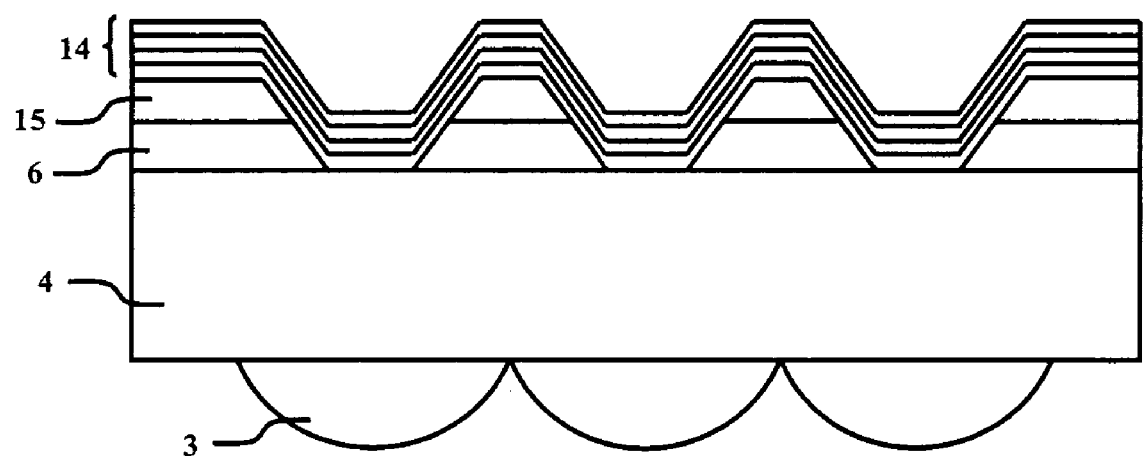

A second solution (embodiment #2) utilizes a metallic layer 6 of about 20 nm in thickness. Apertures are ablated in it, and then a dielectric film stack 14 is installed atop the metallic layer to achieve the desired reflectivity. In this embodiment, the dielectric film stack must also be highly transmissive at the apertures. See FIGS. 21A, 21B, and 21C for an illustration of embodiment #2.

A third solution (embodiment #3), as shown in FIGS. 22A-22E to this problem is to first install a metallic layer 6 of about 20 nm in thickness, ablate apertures 76 in it, and then install a second metallic layer 15, also 20 nm in thickness, ablate apertures 77 in it, repeatedly, until the aggregate thickness of the metallic layers 6,15 is sufficient to cause good reflectivity. Optionally, a final dielectric layer 14, or dielectric layer stack, can be installed to reach even higher reflectivity, but of course the dielectric layer or stack 14 must still maintain good transmittance at the apertures. In the illustrated embodiment, two cycles of metallization and ablation are illustrated, followed by the installation of a dielectric film stack.

Variations and additions to the ablation processes include:

a) (Embodiments 1, 2, and 3) The first metallization layer 6 has been described to be approximately 20 nm thick; however, another approach might be for the first metallization to be comprised of two depositions, such as a 10 nm layer of Chromium, which acts as a binder, followed by a 10 nm deposition of Aluminum, which is more reflective than Chromium.

b) (Embodiments 1, 2, and 3) The total thickness of the metallization 6 (and/or 15) can be between 10 nm and 1000 nm.

c) (Embodiments 1, 2, and 3) The total thickness of the dielectric film stack (13, 14) can be between 20 nm and 2000 nm.

d) (Embodiments 1, 2, and 3) The dielectric materials can include one or more of SiO2, SiO, and TiO2.

e) (Embodiments 1, 2, and 3) The metallic materials can include one or more of Cr, Ag, and Al.

f) (Embodiment 3) The number of metal deposition/ablation cycles can be between one and twenty.

Figure 8A:
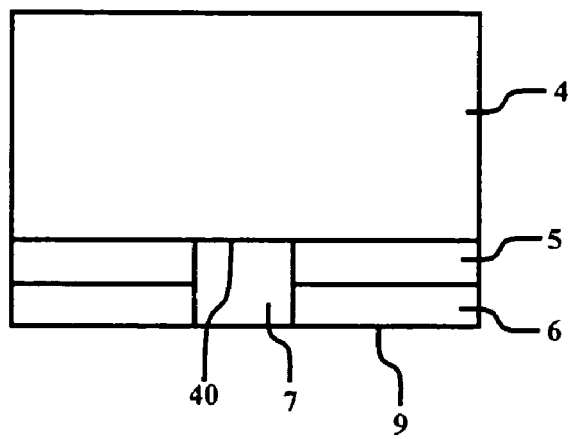
FIG. 8A is a close-up view of an aperture having a flat surface.
Figure 8B:
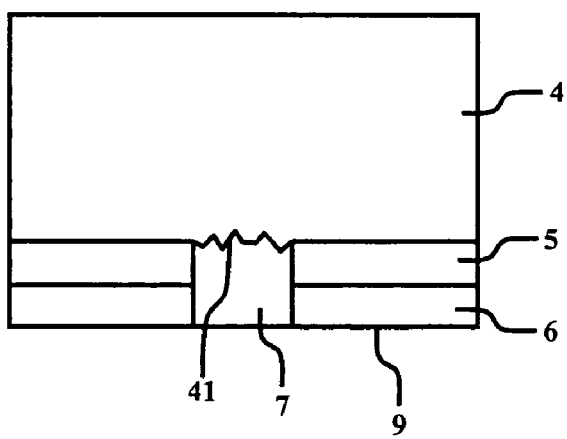
FIG. 8B is a close-up view of an aperture having a textured surface.
Figure 8C:
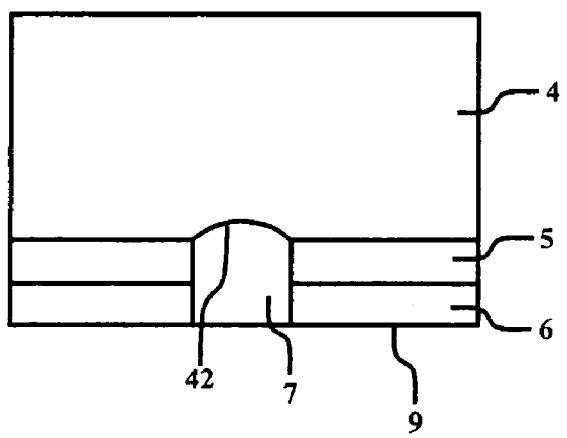
FIG. 8C is a close-up view of an aperture having a surface with optical power.

Depending upon the laser ablation prescription, the surface of the substrate 4 at the aperture location 7 can have differing characteristics. For example, the laser ablation process can leave the substrate 4 surface unaffected, in which case the surface 40 of FIG. 8A is optically smooth and untextured. Alternately the laser ablation process can produce a textured surface finish 41, as shown in FIG. 8B. Lastly, a more aggressive laser ablation process can result in a substrate surface at the aperture that has optical power 42, as shown in FIG. 8C. Often the lensed surface 42 also has a texture superimposed on it.

Figure 10A:
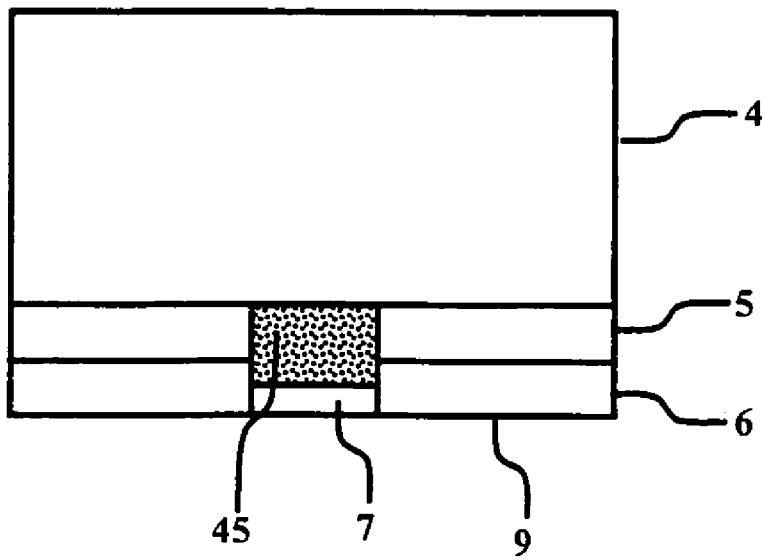
FIG. 10A is close-up view of an aperture which is partially filled.
Figure 10B:
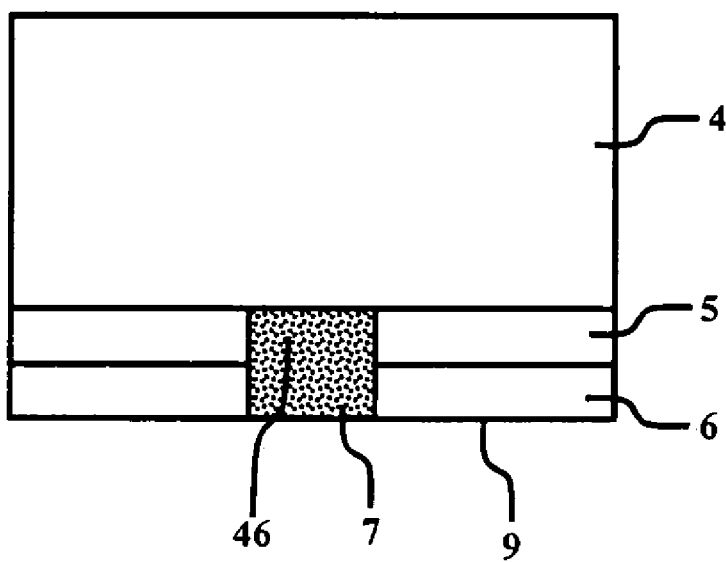
FIG. 10B is close-up view of an aperture which is completely filled.

Once the apertures 7 are completed, and regardless of the texture or shape of the substrate 4 at the aperture, the apertures 7 can then be filled or partially filled to provide another degree of control of the light entering the substrate 4 and subsequently leaving the collimating film 1. As shown in FIG. 10A, an aperture 7 is shown to be partially filled with a material 45. This material can be non-diffusive and transparent, which serves to mitigate the louvering effects of the non-zero thickness of the light absorbing and reflective layers, 5 and 6. Alternately the material 45 can have diffusive particles spread throughout it, or it can have a high haze value. Also, the input surface of the material 45 can be optically smooth, textured, or have optical power. As shown in FIG. 10B, the material 46 (having the same characteristics as material 45) is shown to completely fill the aperture 7.

The fill-material 45 or 46, is in liquid form and can be easily spread over the input surface 9 of the collimating film with a squeegee or other mechanical means and thereby fill the apertures 7. The excess material 45 or 46 is removed from the input surface 9, or it can be left in place (especially if it is non-absorptive) and serve as a protective layer for the reflector 6. Next the material 45 or 46 is allowed to dry, cure, or polymerize and solidify. Often, the fill material 45 shrinks as it solidifies leaving a partially filled aperture 7. Or the fill material 46 may not shrink leaving a completely filled aperture 7 (as in FIG. 10A).

Figure 11:
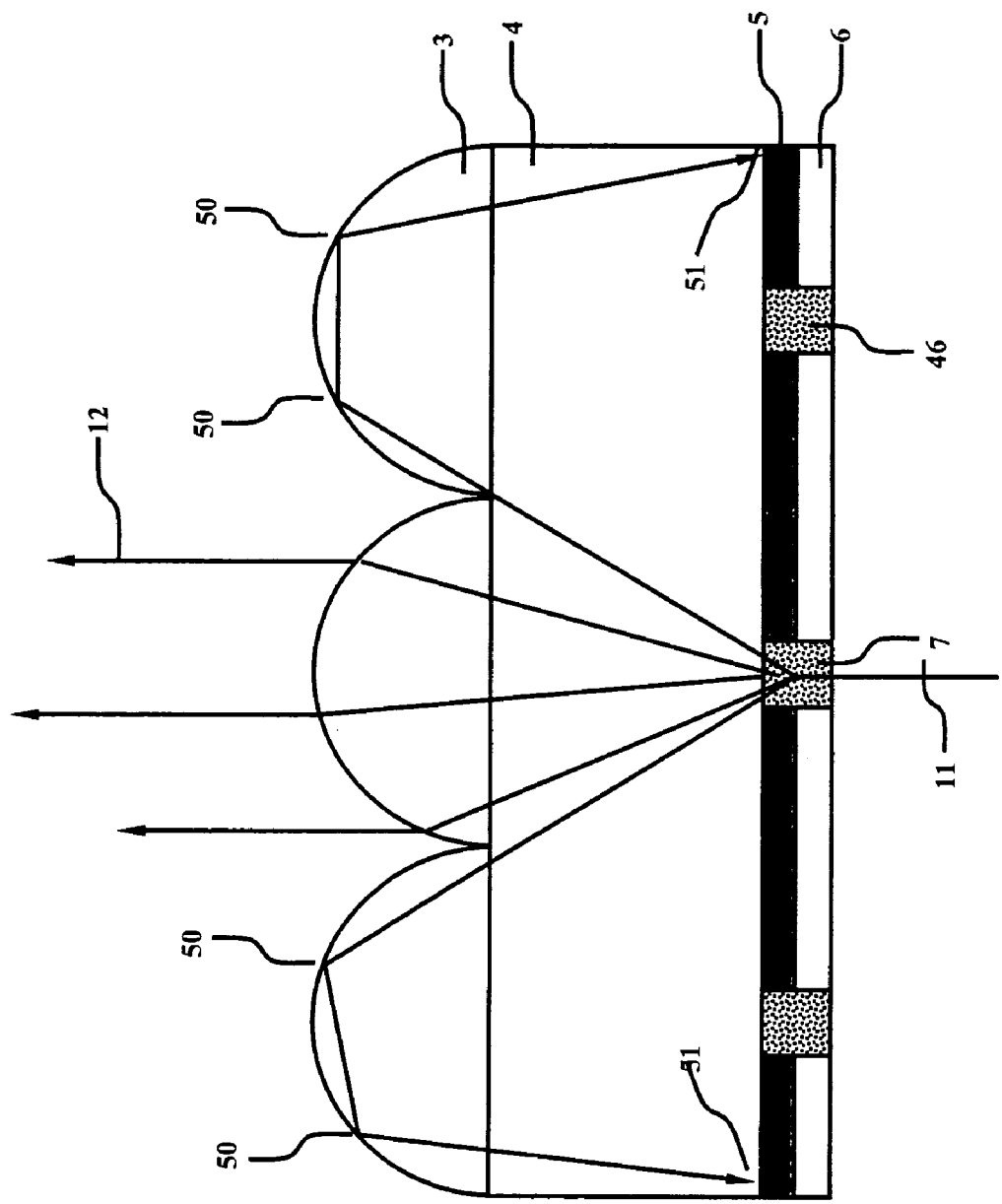
FIG. 11 is a raytrace showing how light from one aperture can reach an adjacent microlens that is subsequently absorbed.

While the fill material 45 or 46 can beneficially improve the optical performance of the finished collimating film 1, it does introduce complications if the fill material 45 or 46 is diffusive. One complication is that the input light 11 can no longer be confined to a cone of light bounded by the critical angle within the substrate 4, and such light can impinge on neighboring lenslets and not just the lenslet corresponding to the aperture. In this case, which can also happen when there is no fill material 45 or 46, but when the substrate 4 surface has optical power 42 or is diffuse 41, the errant light become stray light, and can exit the film at non-collimation angles. The light absorbing layer 5, can help to eliminate the stray light, as shown in FIG. 11. In FIG. 11 the input light 11 is diffusely scattered by the characteristics of the aperture 7, and some of the light reaches neighboring lenslets. Most of the light that reaches the neighboring lenslets totally internally reflect (TIR) 50 from the surface of the neighboring lenslets and are redirected to a point of intersection 51 at the light absorbing layer, where it is subsequently absorbed. Note that light that is diffusely scattered into smaller angles at the aperture 7 only reaches the corresponding lenslet, and the light 12 exits substantially collimated.

In addition to taking care of the light that "overfills" the lenslets 2 of the lens array 3, care must be taken to ensure that the lenslets are not unnecessarily underfilled. The underfilling can occur, for example, by the louvering effect caused by the nonzero thicknesses of the optional light absorbing layer 5 and reflective layer 6. The thicknesses of these layers can cause input light 11 (as shown in FIG. 1) that is oblique (that is, at a large angle with respect to the optical axis 8) to be blocked by the optional absorbing layer 5 and reflective layer 6 whereby this light is incident on the side of the aperture and does not pass through the aperture 7 into the substrate 4. Therefore, it is preferable that the sum of the thicknesses of the optional absorbing layer 5 and reflective layer 6 be as small as possible.

Figure 12:
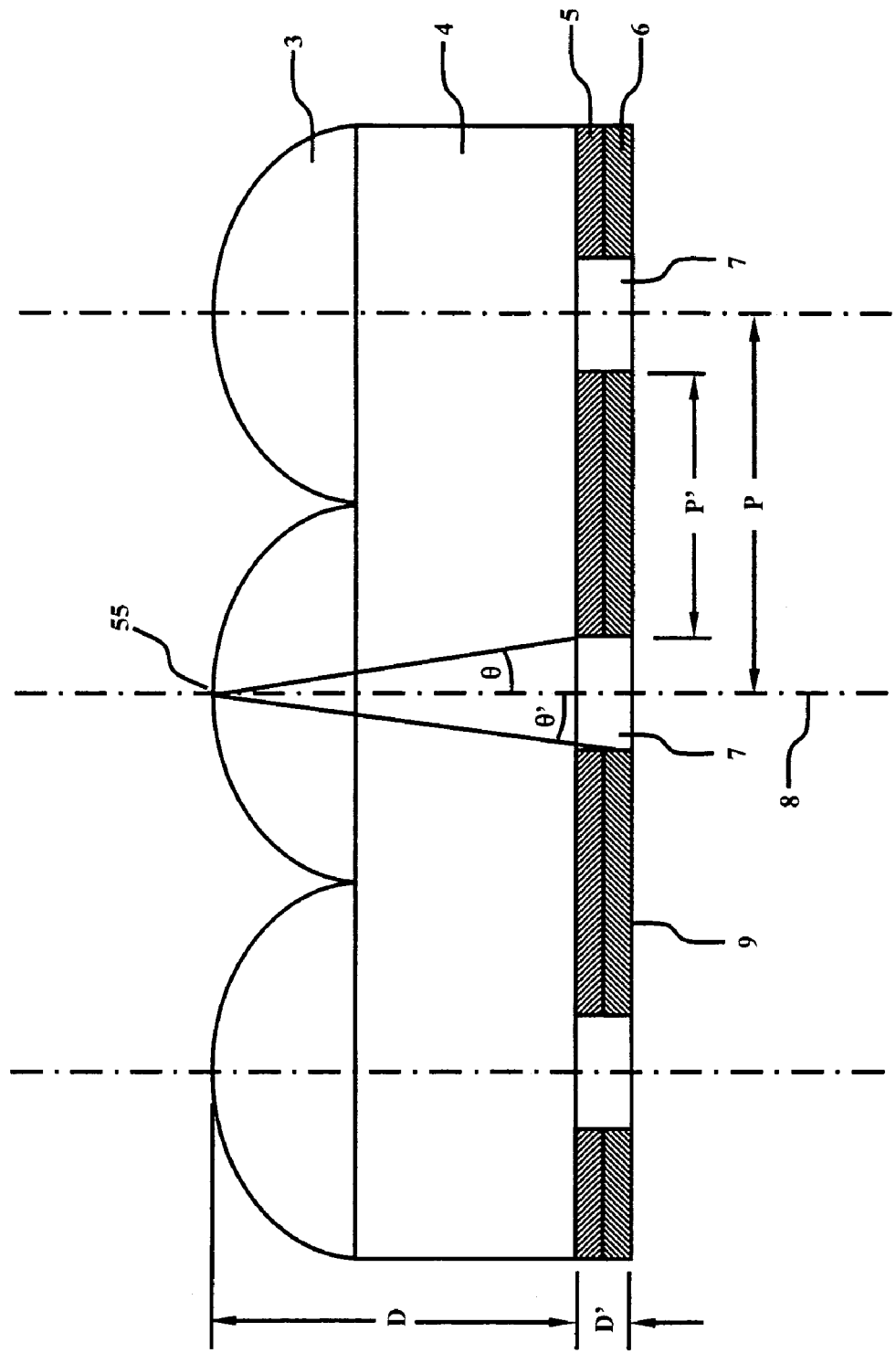
FIG. 12 is a diagram showing the definition of aperture rate.

One measure of the louvering effect is the aperture rate, and is defined using the construction shown in FIG. 12. In FIG. 12 the center-to-center spacing of lenslets is the pitch, P, of which dimension the amount of surface that lies outside of an aperture is designated as P'. The distance from the apex of the lenslets of lens array 3 to the input side of the substrate is D, and the sum of the thickness of the optional absorptive layer 5 and reflective layer 6 is D'. An angle subtended by the optical axis 8 and a line drawn from the apex of a lenslet at the optical axis to the edge of the aperture at the substrate 4 is θ. Similarly, an angle subtended by the optical axis 8 and a line drawn from the apex of a lenslet at the optical axis to the edge of the aperture at the input surface 9 is θ'.

From trigonometry it can be found that $$\theta = \tan^{-1}[(P-P')/2D] \quad (1)$$

and $$\theta' = \tan^{-1}[(P-P')/2(D+D')] \quad (2)$$

from which the aperture rate (AR) can be defined as:

$$AR = (\theta - \theta')/\theta \quad (3)$$

For example, if θ=5° and θ'=4°, then the aperture rate is 20%. Ideally D' is very small, meaning that θ' approaches θ, and the aperture rate goes to zero, in which case the louvering effect is minimized. Preferably the aperture rate is less than 20%, and more preferably is less than 10%, and most preferably is less than 5%.

Figure 13:
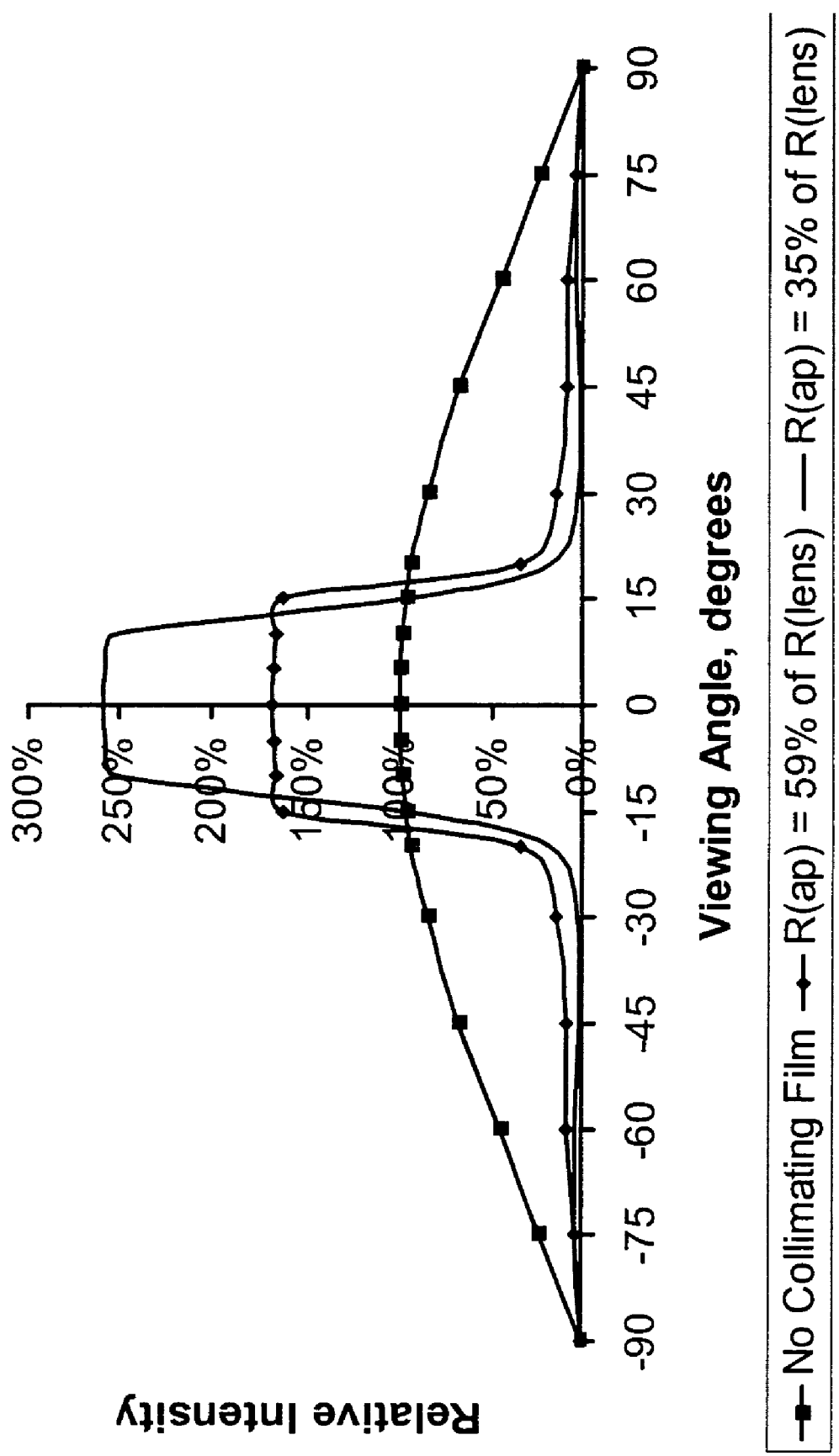
FIG. 13 is a graph of relative intensity outputs with different aperture sizes.

Hypothetical, yet realistic, raytracing has been performed to evaluate the expected performance of the collimating film described above. For this film, P=68 um, the substrate 4 is 2 mil (50.8 um) thick PET, the lenslets 2 of the lens array 3 are aspherical and modeled as a polynomial, having a maximum sag of 27.9 µm with a refractive index the same as the substrate 4. The optional light absorbing layer 5 is excluded, and the thickness of the reflective layer is such that the AR is much less than 5%. In FIG. 13 are shown three normalized curves that resulted from the raytrace. The first, "No Collimating Film" is essentially the output of the backlight/light source, and is a Lambertian curve scaled so that its peak is at 100%. The second curve, "R(ap)=59% of R(lens)" is the output of a raytrace of the above film with the same backlight/source, where the radius of the aperture is 59% of the radius of the lens which comes out to 20 µm. Note that the peak light intensity is now 165% of the case without the collimating film, and the viewing angle is restricted to approximately 20 degrees. The last raytrace plot, "R(ap)=35% of R(lens) is performed where the aperture radius is 35% of the lenslet radius which comes out to 12 µm. Note that the peak light intensity is now over 250% of the case without the collimating film, and the viewing angle has been restricted further to approximately 15 degrees.

Figure 9:
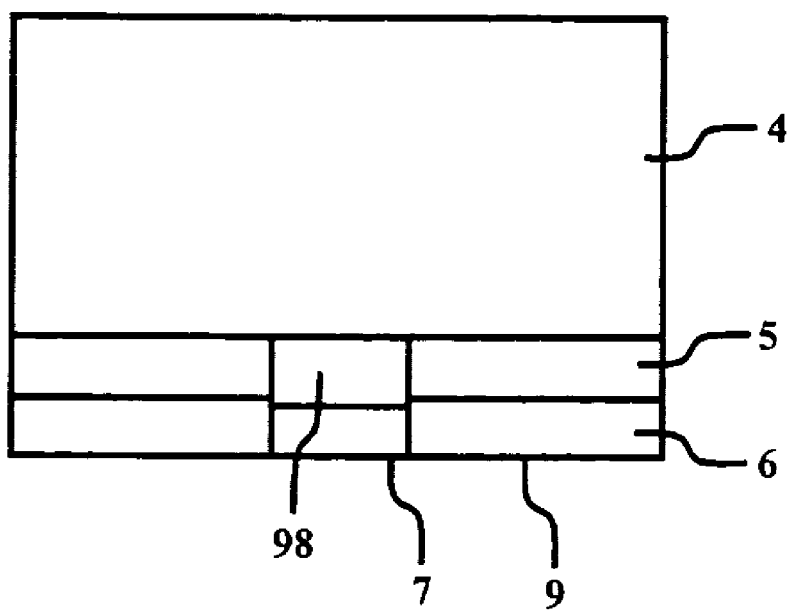
FIG. 9 illustrates an anti-reflective material installed into the aperture.

Another feature that can be added to improve the performance of the collimating film is the addition of an anti-reflective coating, or an anti-reflective subwavelength microstructure, to the output surface of the lenslets 2. The A/R coating 98 can also be applied onto the substrate 4 at the aperture locations 7, as in FIG. 9, while an anti-reflective subwavelength microstructure can be installed over the entire input surface of the substrate 4 prior to the addition of the optional light absorbing layer 5 or the reflective layer 6. Regardless of whether an A/R coating or anti-reflective sub-wavelength microstructure is used, and regardless of which surface(s) it is installed onto, these treatments serve to reduce the Fresnel reflection in which 4% or more of the light incident on a surface is back-reflected, thereby increasing the transmittance and efficiency of the collimating film. That is, adding these surface treatments can improve system transmittance by up to 8%.

The collimating film described above can be used in any optical light source in which the light emission profile is very broad, yet it is desirable to have a narrow light emission profile. Examples of such light sources include projection and light source condensers, advertising and signage applications, flashlights, room lighting, and backlights for liquid crystal displays. The light sources can be LED, OLED, fluorescent lamps (CCFL or HCFL), incandescent, or even arc lamps.

Figure 14:
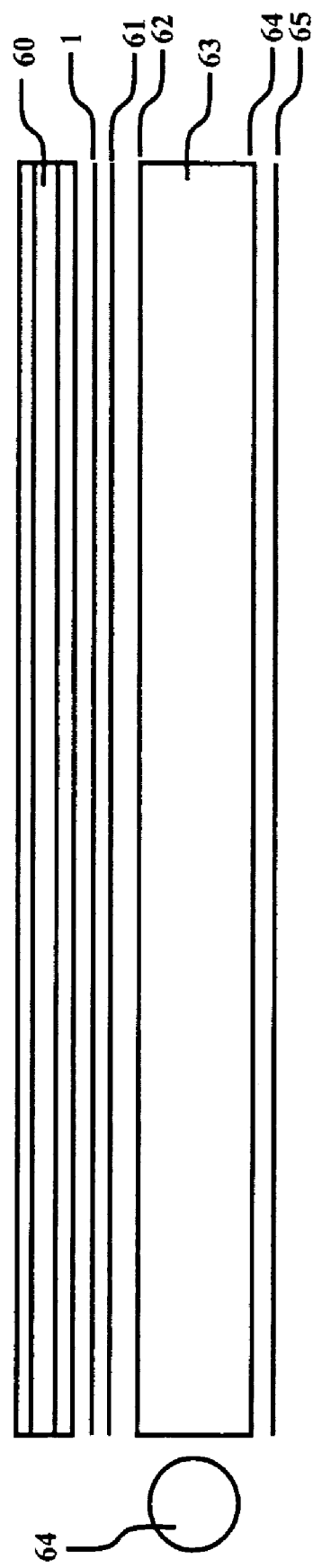
FIG. 14 shows how the collimating sheet can be used in an edge lit backlight system for a display.

Of particular interest is the edge-lit backlight for an LCD application as shown in FIG. 14. In this application the light from the light source 64 is directed into an edge of a light guide 63. The light guide 63 can have diffusive properties, or its front surface 62, or its rear surface 64, can be textured or microstructured to extract light uniformly across the length of the light guide 63. In front of the light guide 63 is an optional reflective polarizer 61 which allows a preferred polarization of the light emanating from the light guide 63 to pass, and reflects back (that is, recycles) that light which is not preferred. A mirror 65, is placed behind the light guide 63 to reflect forward that light which was backreflected by the reflective polarizer 61. On the output side of the optional reflective polarizer 61 is placed the collimating film 1 of the present invention. Light that passes through the apertures 7 of the collimating film 1 exits through the lenslets 2 of the lens array in a collimated fashion as described above. Light that is not incident on an aperture 7 is instead incident on the reflective layer 6 and is in turn reflected and recycled back to the light guide 63 and ultimately the mirror 65 on the rear side of the light guide 65. The mirror 65 acts to redirect the recycled light into a forward direction to the collimating film 1, where the light has another chance at being incident on an aperture 7 and passing through the collimating film 1. After the light passes through the collimating film, it is then incident on the rear surface of the display panel 60.

Figure 15:
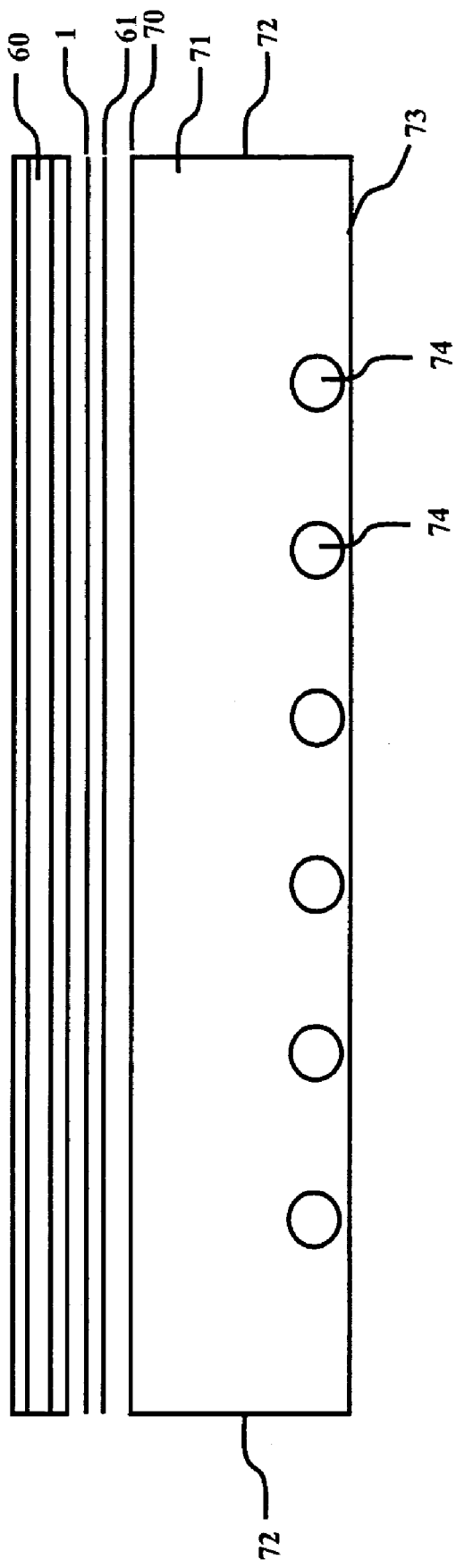
FIG. 15 shows how the collimating sheet can be used in a direct lit backlight system for a display.

Also of interest is the direct lit backlight illustrated in FIG. 15. In this application light from one or more light sources 74 are placed within an optical cavity or mixing chamber 71 behind the display panel 60. The mixing chamber 71 has reflective sides, 72 and 73, and an open front surface 70 that light is allowed to pass through. An optional reflective polarizer 61 is placed at the front surface 70, and it passes light having the preferred polarization, and recycles light having the non-preferred polarization as described above. On the output side of the optional reflecting polarizer 61 is the collimating film 1 of the present invention, whose lenslets 2 collimate the light which successfully passes through the apertures 7, and backreflects that light which otherwise is incident on the reflective layer 9. The backreflected light is returned to the mixing chamber 71 where it is recycled and is eventually redirected back to the optional reflective polarizer 61 and the collimating film 1. After the light passes through the collimating film 1, it is then incident on the rear surface of the display panel 60.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for making a collimating sheet comprising:
providing a substrate with an optical input side and an optical output side; forming a plurality of microlenses on the output side of the substrate;
providing a light absorptive layer on the input side of the substrate;
providing a reflective material layer on the light absorptive layer; and
forming a plurality of apertures in the reflective material layer with a laser ablation process, by directing laser light from the optical output side through at least one of the microlenses and then through the light absorptive layer.

2. A method as in claim 1 wherein the apertures are formed within the reflective layer on the input side of the substrate such that one or more of the apertures have a predetermined spatial relationship with respect to an optical axis of the corresponding microlenses.

3. A method as in claim 2 wherein the apertures are substantially centered on the optical axis of the microlenses.

4. A method as in claim 2 wherein at least one resulting aperture is offset from the optical axis of a corresponding microlens, and at least a second aperture is formed with an off-angle laser ablation at a second angle with respect to the optical axis, wherein the resulting aperture and the second aperture are in the same reflective material layer.

5. A method as in claim 2 wherein the collimating sheet is attached to a rotating and translating drum, and a laser is incident to a nominal point of incidence on the drum.

6. A method as in claim 1 where the collimating sheet is attached to a rotating drum.

7. A method as in claim 6 wherein the collimating sheet is of a size large enough to serve as a sleeve for the rotating drum.

8. A method as in claim 5 wherein the laser is incident at a 90 degree angle with respect to the drum.

9. A method as in claim 6 wherein the rotating drum is located on a horizontal translating stage.

10. A method as in claim 9 wherein the drum is rotatable about a central axis of the drum, and the horizontal translating stage is caused to move such that a relatively large area of the collimating sheet can be exposed to the laser.

11. A method as in claim 5 wherein the aperture is sculpted to an arbitrary shape by varying an angle of incidence of the laser with respect to the drum.

12. A method as in claim 11 wherein the angle of incidence in a vertical plane is varied by raising or lowering the drum with a vertical translation stage.

13. A method as in claim 11 wherein the angle of incidence in the horizontal plane is varied by swiveling the drum about a vertical axis.

14. A method as in claim 11 wherein a sculpted aperture is ablated by performing several cycles of ablation, with each ablation cycle occurring at a different laser angle of incidence with the film, as determined by the orientation of the vertical and horizontal translation stages.

15. A method as in claim 2 wherein the substrate is of a size large enough to serve as a sleeve for the drum.

16. A method as in claim 2 wherein two or more apertures are made per lenslet, with each aperture selectively being sculpted.

17. A method as in claim 6 wherein two or more ablation steps are performed at different positions of the vertical translation stage.

18. A method as in claim 17 where two or more ablation steps are made at different positions of a horizontal swiveling rotational stage.

19. A method as in claim 1 wherein the collimating sheet is moved by one or more steps of spinning, swiveled, translating, raising or lowering with respect to the ablating laser beam.

20. A method as in claim 1 wherein the ablating laser is a YAG laser.

21. A method as in claim 1 wherein the directing laser light from the optical output side through at least one of the microlenses further comprises directing the laser light to a focal position at the light absorptive layer, wherein the laser ablation process selectively removes at least the light absorptive layer without any substantial removal of the substrate through which the laser light extends during the laser ablation process.

22. A method as in claim 1 wherein the providing the reflective material layer further comprises providing a specularly reflective material layer on the light absorptive layer.

23. A method as in claim 1 further comprising providing a dielectric film stack on the reflective material layer on the input side, wherein the forming the plurality of apertures in the reflective material layer further comprises forming the plurality of apertures in the dielectric film stack.

24. A method as in claim 1 further comprising providing another reflective material layer on the reflective material layer on the input side, wherein the forming the plurality of apertures in the reflective material layer further comprises forming the plurality of apertures in the another reflective material layer.

25. A method as in claim 1 wherein the forming the plurality of apertures in the reflective material layer further comprises forming at least one of a textured or optical power surface on a portion of the substrate in one or more of the plurality of apertures.

26. A method as in claim 1 further comprising providing at least one fill material in at least one of the plurality of apertures.

27. A method as in claim 26 wherein the at least one fill material is non-diffusive and substantially transparent.

28. A method as in claim 26 wherein the at least one fill material is diffusive.

29. A method as in claim 1 further comprising providing at least anti-reflective layer in at least one of the plurality of apertures.

30. A method as in claim 1 further comprising providing at least one anti-reflective microstructure over at least a portion of the input side of the substrate, wherein the providing the light absorptive layer is provided on the at least one anti-reflective micro structure.

* * * * *